US009821741B2

(12) United States Patent
Kashiwagi et al.

(10) Patent No.: US 9,821,741 B2
(45) Date of Patent: Nov. 21, 2017

(54) VEHICLE BODY FRONT STRUCTURE

(71) Applicant: HONDA MOTOR CO., LTD., Tokyo (JP)

(72) Inventors: Masakazu Kashiwagi, Wako (JP); Hajime Ohya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/358,405

(22) Filed: Nov. 22, 2016

(65) Prior Publication Data
US 2017/0151919 A1  Jun. 1, 2017

(30) Foreign Application Priority Data
Dec. 1, 2015 (JP) ................. 2015-235020

(51) Int. Cl.
B60R 19/34 (2006.01)
B62D 21/15 (2006.01)
B62D 25/08 (2006.01)
B60R 19/24 (2006.01)

(52) U.S. Cl.
CPC ............ B60R 19/34 (2013.01); B62D 21/152 (2013.01); B62D 25/082 (2013.01); B60R 2019/247 (2013.01)

(58) Field of Classification Search
CPC .. B60R 19/34; B60R 2019/247; B62D 21/152
USPC .......................... 296/187.09, 187.1; 293/133
See application file for complete search history.

(56) References Cited

U.S. PATENT DOCUMENTS

| 9,156,418 | B2* | 10/2015 | Ramoutar | ............... B60R 19/24 |
| 9,446,725 | B2* | 9/2016 | Yamada | ............... B62D 21/152 |
| 2007/0176443 | A1* | 8/2007 | Yasuhara | ............. B62D 21/152 293/133 |
| 2010/0259033 | A1* | 10/2010 | Okabe | .................... B60R 19/34 280/734 |

(Continued)

FOREIGN PATENT DOCUMENTS

JP  2008-168897 A  7/2008
JP  2013-212757 A  10/2013

(Continued)

OTHER PUBLICATIONS

Office Action dated Jul. 21, 2017, issued in counterpart Japanese Applicatino No. 2015-235020, with English translation (7 pages).

Primary Examiner — Jason S Morrow
(74) Attorney, Agent, or Firm — Westerman, Hattori, Daniels & Adrian, LLP

(57) ABSTRACT

In a vehicle body front structure, a left shock absorbing member is provided at a front end portion of a left front side frame and a bumper beam is provided at a front end portion of the left shock absorbing member. A left recessed angle portion is formed by the left shock absorbing member and the bumper beam. An inner coupling member is disposed in the left recessed angle portion. The inner coupling member includes a first end portion and a second end portion. The first end portion is connected to the inner wall front portion with a spacing set between an intersection and the first end portion. Also, the second end portion is connected to the rear wall left portion with a spacing set between the intersection and the second end portion.

10 Claims, 15 Drawing Sheets

(56) References Cited

U.S. PATENT DOCUMENTS

| | | | | |
|---|---|---|---|---|
| 2012/0086225 A1* | 4/2012 | Matsuura | ............ | B62D 21/152 |
| | | | | 293/132 |
| 2013/0241233 A1* | 9/2013 | Ohnaka | ................ | B62D 21/152 |
| | | | | 296/187.1 |
| 2015/0232050 A1* | 8/2015 | Yamada | .................. | B60R 19/34 |
| | | | | 296/187.1 |
| 2015/0360632 A1* | 12/2015 | Nishida | ................ | B62D 21/152 |
| | | | | 293/133 |
| 2016/0272137 A1* | 9/2016 | Nishimura | .............. | B60R 19/34 |
| 2016/0280272 A1* | 9/2016 | Haga | .................... | B62D 27/023 |
| 2017/0001586 A1* | 1/2017 | Ashraf | .................... | B60R 19/34 |
| 2017/0021868 A1* | 1/2017 | Watanabe | ............... | B60R 19/34 |

FOREIGN PATENT DOCUMENTS

| | | | |
|---|---|---|---|
| JP | 2014-113894 A | 6/2014 | |
| JP | 2015-104972 A | 6/2015 | |
| WO | WO-2012/101923 A1 * | 8/2012 | ............ B60R 19/34 |
| WO | 2014/077314 A1 | 1/2017 | |
| WO | 2014/083659 A1 | 1/2017 | |

\* cited by examiner

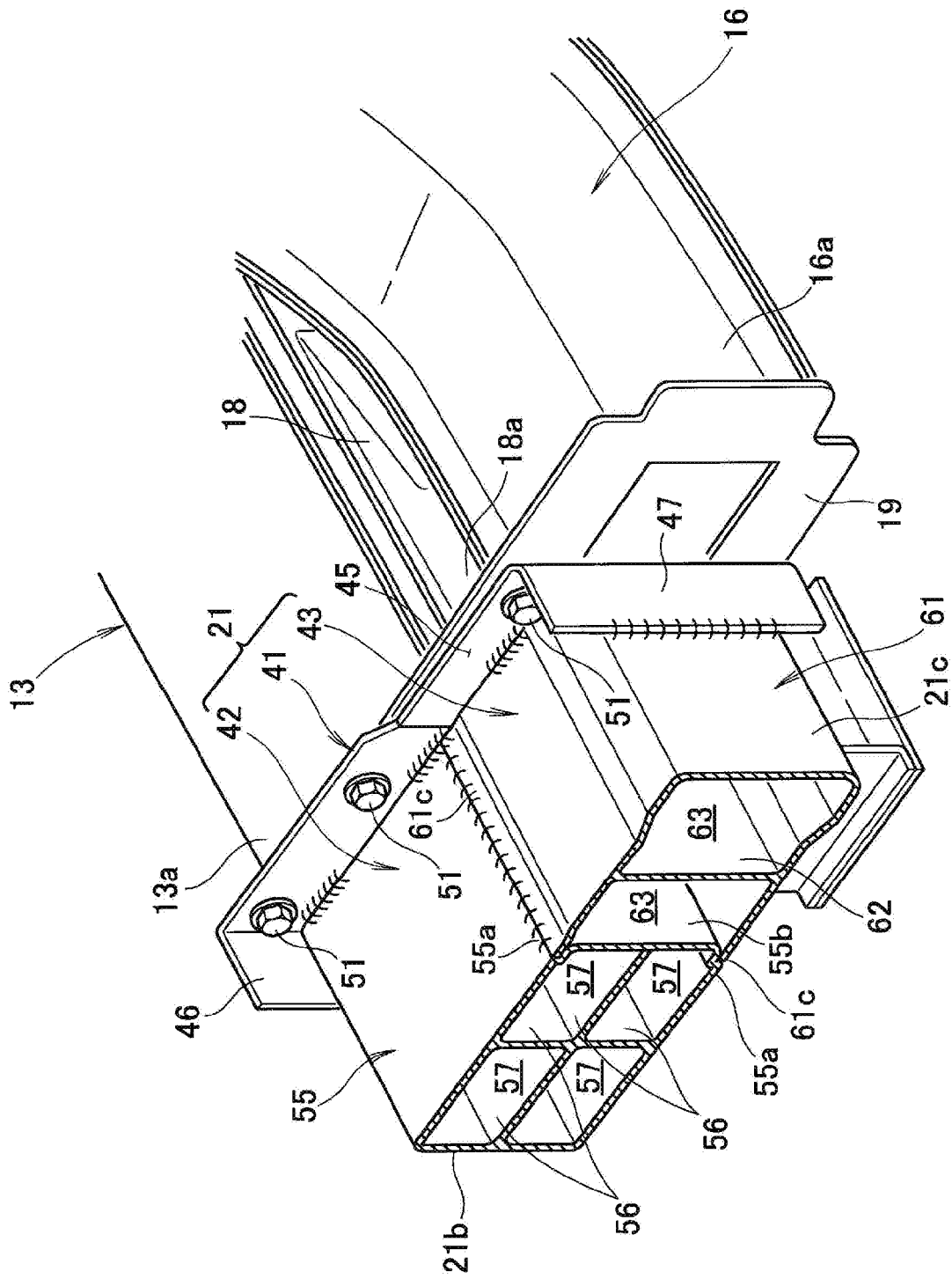

VEHICLE BODY FRONT STRUCTURE

CROSS REFERENCES TO RELATED APPLICATIONS

The present application claims priority under 35 U.S.C. §119 to Japanese Patent Application No. 2015-235020, filed Dec. 1, 2015, entitled "Vehicle Body Front Structure." The contents of this application are incorporated herein by reference in their entirety.

BACKGROUND

1. Field

The present disclosure relates to a vehicle body front structure in which shock absorbing members project from front end portions of front side frames toward the front of a vehicle body and a bumper beam is coupled to the front end portions of the shock absorbing members.

2. Description of the Related Art

Some of the vehicle body front structures are structured such that shock absorbing members project from front end portions of front side frames to the front of a vehicle body, a bumper beam is spanned between the shock absorbing members on both sides, and gussets (referred to as "load transfer members" hereafter) diagonally extend from the bumper beam to outer side walls of the front side frames (see, for example, Japanese Unexamined Patent Application Publication No. 2014-113894).

With the vehicle body front structure according to Japanese Unexamined Patent Application Publication No. 2014-113894, when a shock load is input to the bumper beam due to a small overlap crash at high speed, shock energy can be absorbed by axially collapsing the shock absorbing members toward the rear of a vehicle with the shock load at an initial stage of the crash. Furthermore, the shock load is transferred from the load transfer members to the front side frames, and the front side frames are bent toward a power unit side by the shock load. Thus, the shock energy can be absorbed.

In the case of a minor crash at the front of the vehicle, it is required that shock energy be absorbed only by axial collapsing the shock absorbing members while suppressing deformation of the front side frames. However, with the vehicle body front structure according to Japanese Unexamined Patent Application Publication No. 2014-113894, when the shock absorbing members are axially collapsed toward the rear of the vehicle body due to a minor crash, a shock load is transferred from the load transfer members to the front side frames, and lateral loads act on the front side frames. Thus, there is a possibility of the front side frames being bent (deformed) and, from this viewpoint, there is still room for improvement.

SUMMARY

The present application describes a vehicle body front structure that can preferably absorb shock energy in both types of crashes, that is, a small overlap crash and a minor crash at the front of the vehicle.

According to an aspect of the present application, a vehicle body front structure includes front side frames, shock absorbing members, and a bumper beam. The front side frames are provided on one side and another side of a vehicle body. The shock absorbing members project from front end portions of the front side frames toward a front of the vehicle body. The bumper beam is coupled to front end portions of the shock absorbing members and extends in a vehicle width direction. Recessed angle portions are formed by inner side walls of the shock absorbing members (i.e., side walls disposed on an vehicle inner side of the shock absorbing members) and a rear wall of the bumper beam to have recessed shapes, and the recessed angle portions have intersections between the inner side walls and the rear wall. The vehicle body front structure also includes coupling members. Each of the coupling members is disposed in a corresponding one of the recessed angle portions. The coupling member has a substantially L shape in plan view. The coupling member includes a first end portion and a second end portion. The first end portion is disposed in a corresponding one of the inner side walls and connected to the inner side wall with a spacing set between the first end portion and a corresponding one of the intersections. The second end portion is disposed in the rear wall and connected to the rear wall with a spacing set between the second end portion and the intersection.

End portions of the bumper beam extend in directions that are outward in the vehicle width direction and diagonally rearward in the vehicle front-rear direction. Accordingly, at an initial stage of the small overlap crash, a component force of a shock load having been input to one of the end portions of the bumper beam laterally acts on the bumper beam. Thus, a connecting portion (that is, a welded portion) between the opposite end portion of the bumper beam and the front end portion of one of the shock absorbing member is broken, thereby the opposite end portion and the front end portion are separated from each other.

From this state, when the small overlap crash advances, the other shock absorbing member is axially collapsed, and a tensile force toward the small overlap crash side acts on the bumper beam. Here, a connecting portion between the opposite end portion of the bumper beam and the front end portion of the one shock absorbing member has been broken. Thus, the front side frame cannot be pulled toward the small overlap crash side by the opposite end portion of the bumper beam. Thus, shock energy cannot be absorbed by utilizing resistance against deformation of the front side frame toward the small overlap crash side (that is, a force suppressing deformation of the front side frame).

In order to address this, the coupling member having a substantially L shape in plan view is disposed in each of the recessed angle portions. Furthermore, the first end portion of the coupling member is connected to the inner side wall of the corresponding shock absorbing member with the spacing set between the first end portion and the intersection of the recessed angle portion. Furthermore, the second end portion of the coupling member is connected to the rear wall of the bumper beam with the spacing set between the second end portion and the intersection. Thus, the coupling member having a substantially L shape in plan view can be provided without inhibiting load adjustment performed by the recessed angle portion. Here, the strength of the coupling member in the lateral direction is low, and accordingly, concentration of the load can be suppressed.

Accordingly, at an initial stage of the small overlap crash, a component force of a shock load having been input to one of the end portions of the bumper beam laterally acts on the bumper beam. This may produce cracks in the connecting portion between the opposite end portion of the bumper beam and the front end portion of the one shock absorbing member. Even in this case, concentration of stress in the connecting portions of the first end portions and the second end portions can be prevented. That is, breakage of the connecting portions of the first end portion and the second end portion can be suppressed. Furthermore, even when, for example, the connecting portion between the opposite end portion of the bumper beam and the front end portion of the one shock absorbing member is broken, the coupling member that has a low strength in the lateral direction can suppress concentration of the load. Accordingly, the coupling member is kept unbroken even after a lateral load has been input. Thus, the coupling (connection) between the opposite end portion of the bumper beam and the front end portion of the one shock absorbing member can be maintained.

In this state, when the small overlap crash advances, the other shock absorbing member is axially collapsed, and the tensile force toward the small overlap crash side acts on the bumper beam. Here, even when, for example, the connecting portion between the opposite end portion of the bumper beam and the front end portion of the other shock absorbing member is broken, the coupling member that has a low strength in the lateral direction can suppress concentration of the load. Accordingly, the coupling member is kept unbroken even after the lateral tensile force has been input, and the opposite end portion of the bumper beam and the front end portion of the one shock absorbing member are coupled to each other by the coupling member. Thus, the tensile force in the lateral direction acts on the front side frame through the opposite end portion of the bumper beam and the one shock absorbing member. Thus, shock energy can be preferably absorbed by utilizing the resistance against deformation of the front side frame toward the small overlap crash side.

Furthermore, the first end portion of the coupling member is connected with the spacing set between the first end portion and the intersection. Also, the second end portion is connected with the spacing set between the second end portion and the intersection. That is, connection of the coupling member to the intersection of the recessed angle portion is prevented. This can suppress an increase of the strength of the intersection of the recessed angle portion more than required. As described above, the coupling member is not connected to the intersection. Thus, in the event of a frontal (flat) crash such as a minor crash at the front of the vehicle, inhibition of the shock absorbing performance of the shock absorbing members can be suppressed.

Accordingly, in the event of a minor crash (for example, a crash at the speed of 15 km/h or lower) at the front of the vehicle, the shock absorbing members can be axially collapsed from the intersections of the recessed angle portions by the shock loads input to the shock absorbing members. Thus, the shock absorbing members can be entirely axially collapsed, and accordingly, shock energy generated by the minor crash can be preferably absorbed. The shock absorbing performance can be ensured without deformation of the front side frames by absorbing with the shock absorbing members the shock energy generated by the minor crash.

As described above, according to the aspect of the present application, shock energy in both types of crashes, that is, a small overlap crash and a minor crash can be preferably absorbed. It is noted that the positions of the first end portion and the second end portion of each of the coupling members having a substantially L shape in plan view are selected so that relative displacement of the connecting portion between the end portion of the bumper beam and the front end portion of the shock absorbing member on the small overlap crash side can be minimized.

Preferably, the coupling member is formed by bending a belt-shaped metal plate into a substantially L-shape. Thus, a load uniformly transferred through the coupling member in a single direction can be dispersed, and the tensile strength of the coupling member can be ensured. Preferably, a periphery of the first end portion of the coupling member is connected along a substantially U shape to the inner side wall, and a periphery of the second end portion of the coupling member is connected along a substantially U shape to the rear wall. Thus, the coupling member can be firmly connected to both the shock absorbing member and the bumper beam, and a load uniformly transferred through the coupling member in a single direction can be dispersed.

Thus, connection achieved by coupling between the opposite end portion of the bumper beam and the front end portion of the shock absorbing member can be reliably maintained by the coupling member at an initial stage of a small overlap crash. Furthermore, when the small overlap crash advances, the tensile force toward the small overlap crash side can be reliably applied to the front side frame by the coupling member. Thus, shock energy can be preferably absorbed by utilizing resistance against deformation of the front side frame toward the small overlap crash side.

Here, the strength of the belt-shaped metal plate against a compression is reduced. Thus, the coupling member formed by bending the belt-shaped metal plate can preferably undergo compressive deformation when the shock absorbing member is axially collapsed. Thus, in the event of a minor crash at the front of the vehicle, the shock absorbing members can be entirely axially collapsed, and accordingly, shock energy generated by the minor crash can be preferably absorbed.

Preferably, the shock absorbing members each have a fragile portion between the intersection and the first end portion of the inner side wall. Thus, the fragile portion is formed at the front end portion of each of the shock absorbing members. With this, in the event of a minor crash at the front of the vehicle, the shock absorbing members can be axially collapsed entirely from the front end portions, and accordingly, shock energy generated by the minor crash can be preferably absorbed.

Preferably, the vehicle body front structure further includes outer coupling members that are provided at front surfaces of end portions of the bumper beam and that are connected to outer side walls of the shock absorbing members such that the outer coupling members are superposed on the outer side walls. Thus, when a tensile force toward the small overlap crash side acts on the bumper beam, connection between one of the outer coupling members and a corresponding one of the outer side walls can be maintained. That is, the tensile force toward the small overlap crash side can be more reliably applied to the front side frame by the coupling member. Thus, shock energy can be preferably absorbed by utilizing resistance against deformation of the front side frame toward the small overlap crash side.

Furthermore, each of the outer coupling members is superposed on and connected to the outer side wall of a corresponding one of the shock absorbing members. Thus, the outer coupling member is connected to a portion of the shock absorbing member separated from the front end portion of the shock absorbing member. With this structure, in the event of a minor crash at the front of the vehicle, the shock absorbing members can be axially collapsed entirely from the front end portions, and accordingly, shock energy generated by the minor crash can be preferably absorbed.

Preferably, the shock absorbing members include coupling plates that are fastened to the front end portions of the front side frames by fastening members. Preferably, each of the coupling plates includes an inner flange that extends along the inner side wall of a corresponding one of the shock absorbing members and that is connected to the inner side wall, and an outer flange that extends along an outer side wall of the shock absorbing member and that is connected to the outer side wall. Thus, when a tensile force toward the small overlap crash side acts on the bumper beam, connection between the inner flange and the inner side wall and connection between the outer flange and the outer side wall can be maintained.

Thus, the tensile force toward the small overlap crash side can be more reliably applied to the front side frame. That is, shock energy can be preferably absorbed by utilizing resistance against deformation of the front side frame.

Furthermore, the inner flange extends along the inner side wall and the outer flange extends along the outer side wall. Accordingly, in the event of a minor crash at the front of the vehicle, when the shock absorbing members are each axially collapsed toward the rear of the vehicle body, the inner flange and the outer flange can be preferably deformed. Thus, the shock absorbing members can be axially collapsed entirely from the front end portions, and accordingly, shock energy generated by the minor crash can be preferably absorbed.

Preferably, each of the coupling plates has an insertion hole through which a corresponding one of the fastening members is inserted, and the coupling plate is fastened to the front end portion of a corresponding one of the front side frame by a fastening surface pressure applied by the fastening member inserted through the insertion hole, and a hole diameter of the insertion hole is set so that, when a small overlap crash occurs at one end portion of the bumper beam, the fastening surface pressure is smaller than a tensile force acting on the fastening member on an opposite end portion side of the bumper beam. Here, in the event of a small overlap crash at one end portion of the bumper beam, a tensile force acts on the fastening member on the opposite end portion side of the bumper beam from the coupling plate. The hole diameter of the insertion hole is set so that the fastening surface pressure is smaller than this tensile force. Thus, the insertion hole of the coupling plate can be removed from the fastening member by the tensile force acting on the fastening member from the coupling plate.

The coupling plate may be fastened to the front end portion of the front side frame by a plurality of fastening members. In this case, in the event of a small overlap crash, the insertion hole of the coupling plate can be removed from one of the plurality of fastening members on the outer side in the vehicle width direction. This causes the shock absorbing member and the coupling plate to be diagonally moved toward the small overlap crash side. Thus, application of excessive loads to connecting portions of the coupling member, the outer coupling member, the inner flange, and the outer flange can be prevented.

Meanwhile, the coupling plate is maintained in a state in which the coupling plate is fastened to the front end portion of the front side frame by the remaining fastening members. Accordingly, the tensile force toward the small overlap crash side can be applied to the front side frame. Thus, shock energy can be preferably absorbed by utilizing the resistance against deformation of the front side frame, and accordingly, the shock absorbing performance for the shock energy can be ensured.

Preferably, the vehicle body front structure further includes load transfer members that extend outward in the vehicle width direction from the front end portions of the front side frames. In this case, the shock absorbing members are coupled to the front end portions of the front side frames and the front end portions of the load transfer members. Thus, the shock absorbing members can extend further toward the outside than the front end portions of the left front side frames in the vehicle width direction. Accordingly, in the event of a small overlap crash, the shock absorbing member extending outward in the vehicle width direction can be axially collapsed. This can increase an absorption amount of shock energy.

Since the load transfer members extend further toward the outer side than the front end portions of the front side frames in the vehicle width direction, it is ensured that the shock absorbing members have large sections. Thus, in the event of a minor crash at the front of the vehicle, a typical full lap crash, or an offset crash (that is, a 30 to 50% overlap crash), the shock absorbing member is entirely axially collapsed. Thus, shock energy can be preferably absorbed. That is, the shock absorbing performance for shock energy due to a minor crash at the front of the vehicle, a typical full lap crash, and an offset crash can be ensured.

Preferably, the shock absorbing members each include a first shock absorbing member having a closed section that has a plurality of small sections and that extends in a vehicle front-rear direction, and a second shock absorbing member that is disposed further to the outer side than the first shock absorbing member in the vehicle width direction and that has a closed section that has a plurality of small sections and that extends in the vehicle front-rear direction. With the second shock absorbing member provided further to the outer side than the first shock absorbing member in the vehicle width direction as described above, the section of the shock absorbing member can be increased. The strength of the shock absorbing member can be preferably increased by increasing the section of the shock absorbing member and partitioning the closed section of the shock absorbing member into the plurality of small sections. Thus, the energy absorption amount of the shock absorbing members can be increased by the axial collapse of the shock absorbing member having high strength caused by a shock load.

Furthermore, the closed section of the first shock absorbing member extends in the vehicle front-rear direction. Likewise, the closed section of the second shock absorbing member extends in the vehicle front-rear direction. Thus, the first shock absorbing member and the second shock absorbing member can be formed by, for example, extruding light metal materials such as aluminum alloys. This can increase ease of production of the shock absorbing members.

Preferably, the bumper beam has a closed section that has a plurality of small sections, the front surfaces of the end portions of the bumper beam are open so as to face in directions that are outward in the vehicle width direction and diagonally rearward in a vehicle front-rear direction, and the front surfaces that are open are closed by the outer coupling members.

That is, the strength of the end portions of the bumper beam is preferably increased. Thus, a shock load due to a small overlap crash can be supported by the end portion of the bumper beam, and the shock load input to the end portion of the bumper beam can be transferred to the entirety of the front end portion of the shock absorbing member. Accordingly, the shock absorbing member can be entirely axially collapsed by the transferred shock load. This can increase the absorption amount for the shock energy.

According to the present application, in the event of a small overlap crash, shock energy generated by the small overlap crash can be preferably absorbed by utilizing resistance against deformation of the front side frame toward the small overlap crash side. Furthermore, in the event of a minor crash at the front of the vehicle, the shock absorbing members can be entirely axially collapsed, and accordingly, shock energy generated by the minor crash at the front of the vehicle can be preferably absorbed without deformation of the front side frames.

BRIEF DESCRIPTION OF THE DRAWINGS

FIG. 7 is a sectional view taken along line VII-VII of FIG. 4.

DESCRIPTION OF THE PREFERRED EMBODIMENTS

An embodiment of the present application will be described below with reference to the accompanying drawings. Herein, "front (Fr)", "rear (Rr)", "left (L)", and "right (R)" directions are those seen from a driver.
Embodiment A vehicle body front structure 10 according to an embodiment is described. The vehicle body front structure 10 is substantially left-right symmetry. Thus, members on the left side and equivalent members on the right side of the vehicle body front structure 10 are denoted by the same reference signs, and the members on the left side are described in detail while description of those on the right side is omitted.

Figure 1:
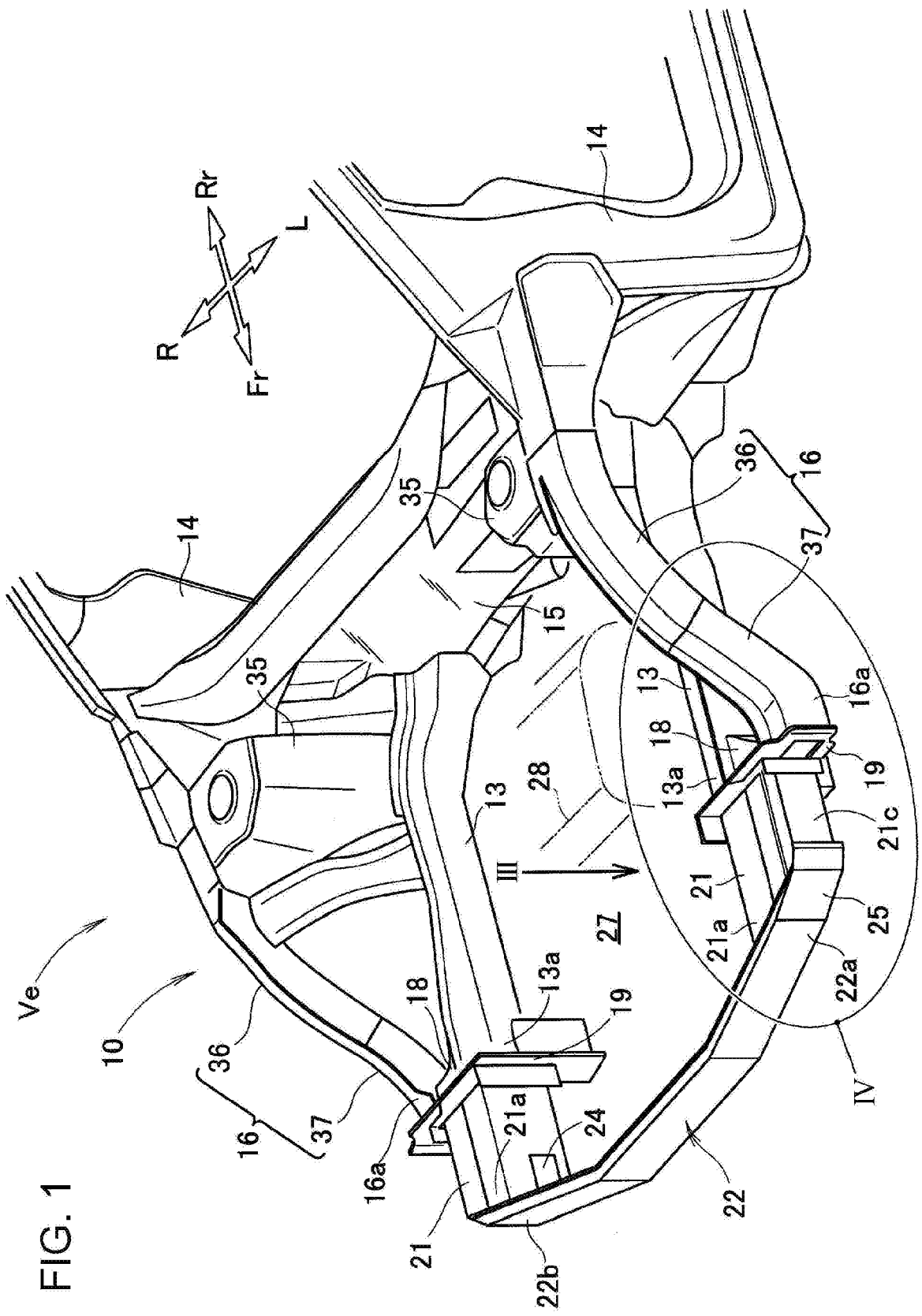
FIG. 1 is a perspective view of a vehicle body front structure according to the present application.
Figure 2:
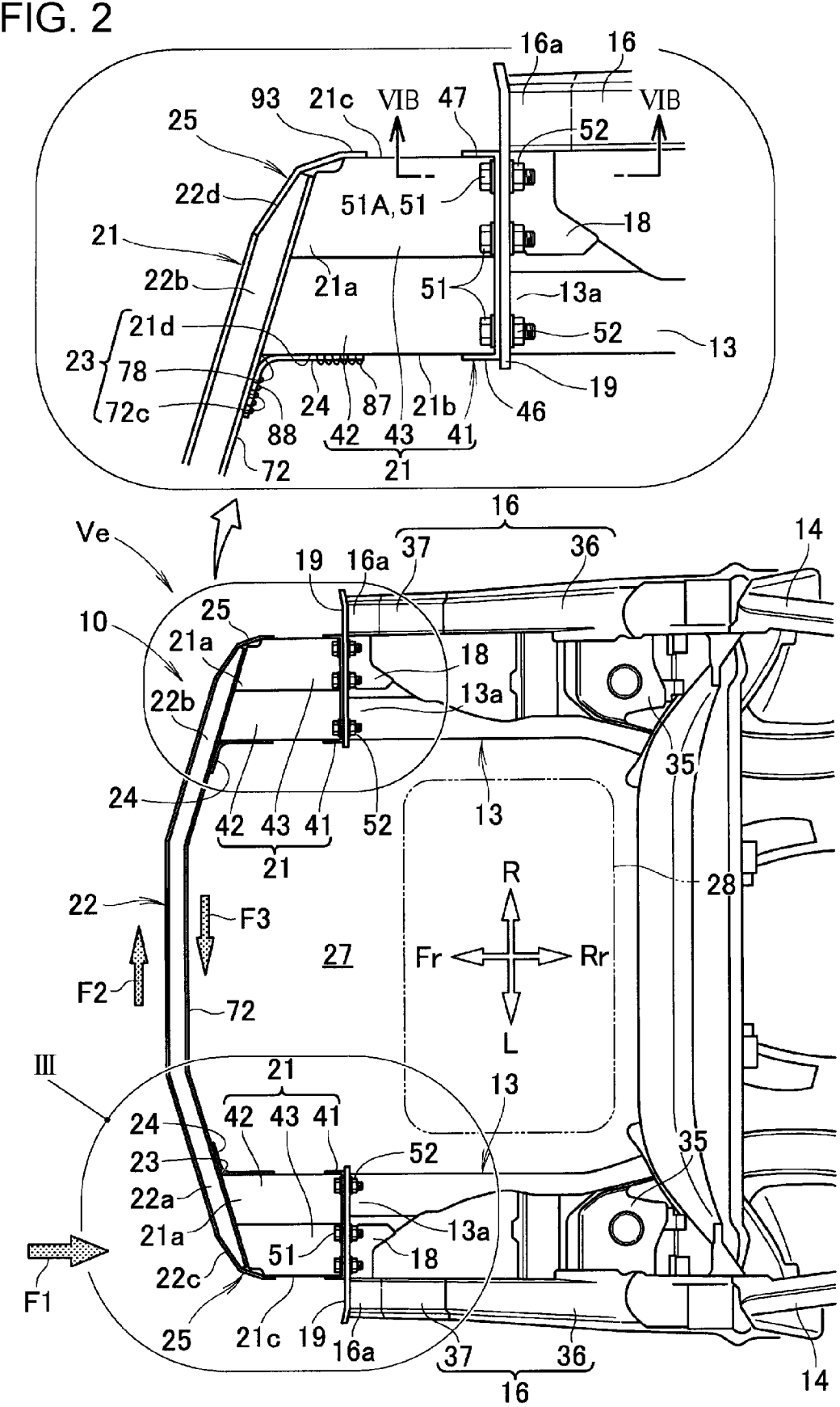
FIG. 2 is a plan view of the vehicle body front structure of FIG. 1.

As illustrated in FIGS. 1 and 2, the vehicle body front structure 10 is part of a front structure of a vehicle Ve. The vehicle body front structure 10 includes a left front side frame 13, a left front pillar 14, a lower dashboard 15, and a left side member 16. The left front side frame 13 is one of front side frames 13 provided on both sides of the vehicle body. The left front pillar 14 is provided on the outer side of the left front side frame 13 in a vehicle width direction. The lower dashboard 15 is interposed between the left front pillar 14 and a right front pillar 14. The left side member 16 extends from the left front pillar 14 toward the front of the vehicle body.

The vehicle body front structure 10 further includes a left coupling bracket (load transfer member) 18, a left attachment member 19, and a left shock absorbing member 21. The left coupling bracket 18 couples a front end portion 16a of the left side member 16 to a front end portion 13a of the left front side frame 13. The left attachment member 19 is attached to the front end portion 13a of the left front side frame 13 and the left coupling bracket 18. The left shock absorbing member 21 is attached to the left attachment member 19.

The vehicle body front structure 10 still further includes a bumper beam 22, a left recessed angle portion (recessed angle portion) 23, a left inner coupling member (coupling member) 24, and a left outer coupling member (outer coupling member) 25. The bumper beam 22 is spanned between a front end portion 21a of the left shock absorbing member 21 and a front end portion 21a of a right shock absorbing member 21. The left recessed angle portion 23 is formed by the left shock absorbing member 21 and the bumper beam 22. The left inner coupling member 24 is connected to the left recessed angle portion 23. The left outer coupling member 25 is connected to a left end portion 22a of the bumper beam 22 and an outer side wall 21c of the left shock absorbing member 21.

The engine room 27 is formed by the left front side frame 13, a right front side frame 13, and the bumper beam 22. A power unit 28 is disposed in the engine room 27. The power unit 28 is, for example, a unit into which an engine and a transmission are integrated.

Here, forces acting on the bumper beam 22 due to a small overlap crash are described with reference to FIG. 2. The small overlap crash refers to a crash in which, for example, the outer side of the left front side frame 13 of the front part of a vehicle by one fourth of a vehicle width in the vehicle width direction crashes into an obstacle such as another vehicle, a tree, or a utility pole. The small overlap crash is also referred to as a narrow offset crash or a small lap crash. According to the embodiment, a representative example in which a shock load F1 is input to the left end portion 22a of the bumper beam 22 due to a small overlap crash is described. Here, the left end portion 22a of the bumper beam 22 extends outward in the vehicle width direction and diagonally rearward in the vehicle front-rear direction.

Accordingly, at an initial stage of the small overlap crash, a component force F2 of the shock load F1 having been input to the left end portion 22a of the bumper beam 22 laterally (that is, inward in the vehicle width direction) acts on the bumper beam 22. Due to advancement of the small overlap crash from this state, the left shock absorbing member 21 is axially collapsed, and a tensile force F3 toward the small overlap crash side acts on the bumper beam 22.

Figure 3:
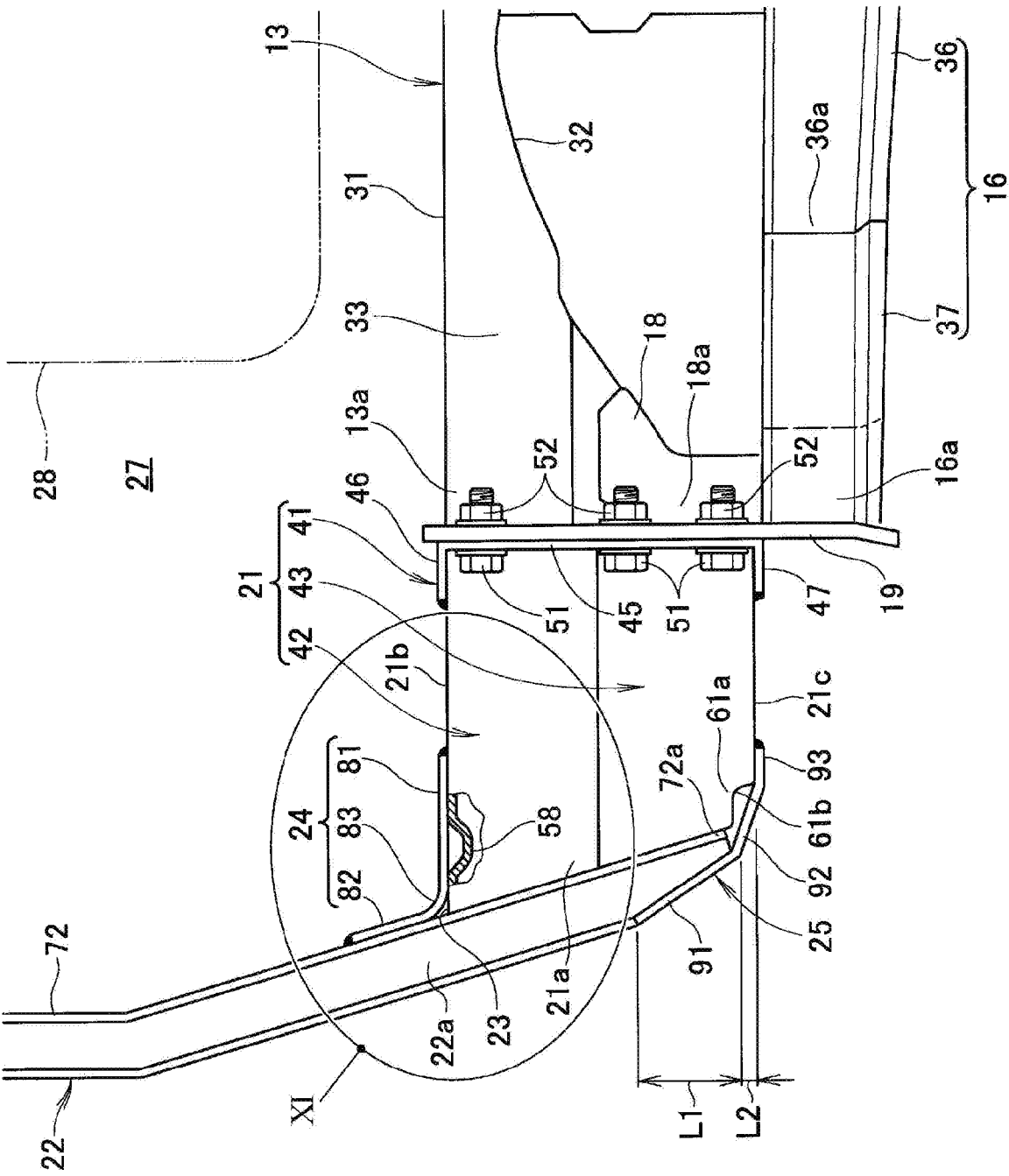
FIG. 3 is an enlarged view of part III of FIG. 2.

Next, the members of the vehicle body front structure 10 are described in detail. As illustrated in FIG. 3, the left front side frame 13 extends in the vehicle front-rear direction and includes a frame inner wall 31, a frame outer wall 32, a frame upper portion 33, and a frame lower portion (not illustrated). With the frame inner wall 31, the frame outer wall 32, the frame upper portion 33, and the frame lower portion, the left front side frame 13 has a closed section having a substantially rectangular shape in section. That is, the left front side frame 13 has high strength and high stiffness. The left side member 16 is disposed on the outer side of the left front side frame 13 in the vehicle width direction and substantially parallel to the left front side frame 13 in plan view.

The left side member 16 includes an upper member 36 and a lower member 37. The upper member 36 extends from the left front pillar 14 toward the front of the vehicle body via a left damper housing 35 (see FIG. 1). The lower member 37 inclined downward from a front end portion 36a of the upper member 36 toward the front of the vehicle. Similarly to the left front side frame 13, the left side member 16 having hollow closed section (specifically a closed section having a substantially rectangular shape in section) has high strength and high stiffness.

The front end portion 16a of the left side member 16 is coupled to the front end portion 13a of the left front side frame 13 through the coupling bracket 18. That is, the coupling bracket 18 extends outward in the vehicle width direction from the front end portion 13a of the left front side frame 13 toward the front end portion 16a of the left side member 16. Furthermore, the left attachment member 19 is attached to the front end portion 13a of the left front side frame 13, a front end portion 18a of the left coupling bracket 18, and the front end portion 16a of the left side member 16.

The left shock absorbing member 21 is attached to the left attachment member 19 from the front side of the vehicle body. Specifically, the left shock absorbing member 21 is coupled to the front end portion 13a of the left front side frame 13 and the front end portion 18a of the coupling bracket 18 through the left attachment member 19. Thus, the left shock absorbing member 21 extends further toward the outside than the front end portion 13a of the left front side frame 13 in the vehicle width direction.

In this state, the left shock absorbing member 21 projects toward the front of the vehicle from the front end portion 13a of the left front side frame 13 and the front end portion 18a side of the coupling bracket 18. The left end portion 22a of the bumper beam 22 is coupled to the front end portion 21a of the left shock absorbing member 21. That is, the left shock absorbing member 21 also functions as a bumper beam extension for coupling the left end portion 22a of the bumper beam 22.

The shock load input from the front of the vehicle body to the left shock absorbing member 21 is transferred to the front end portion 13a of the left front side frame 13 and the front end portion 18a of the coupling bracket 18. The shock load transferred to the front end portion 13a of the left front side frame 13 and the front end portion 18a of the coupling bracket 18 is supported by the left front side frame 13 and the coupling bracket 18. Thus, the left shock absorbing member 21 is axially collapsed toward the rear of the vehicle body due to the shock load.

Figure 4:
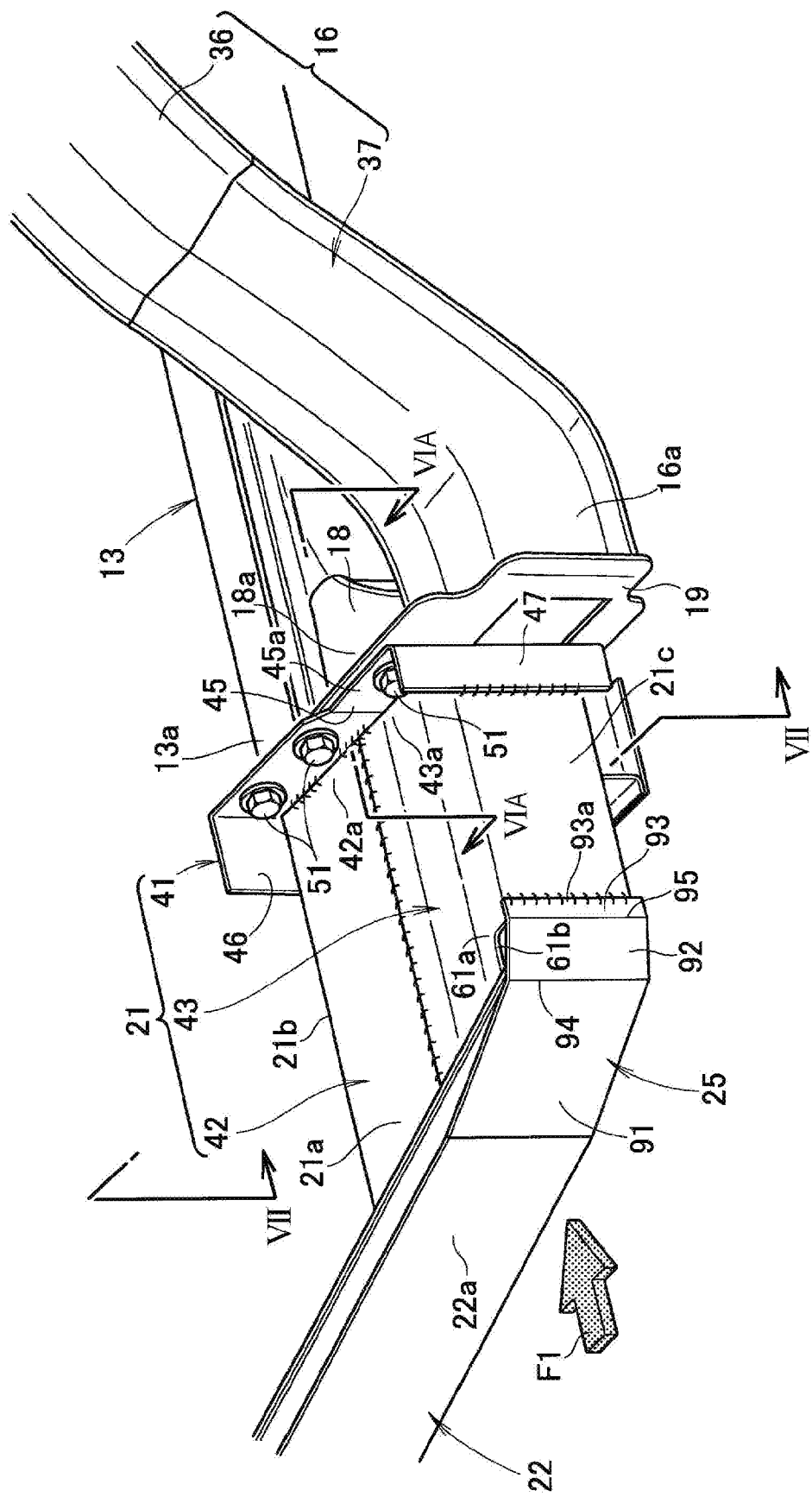
FIG. 4 is an enlarged view of part IV of FIG. I.
Figure 5:
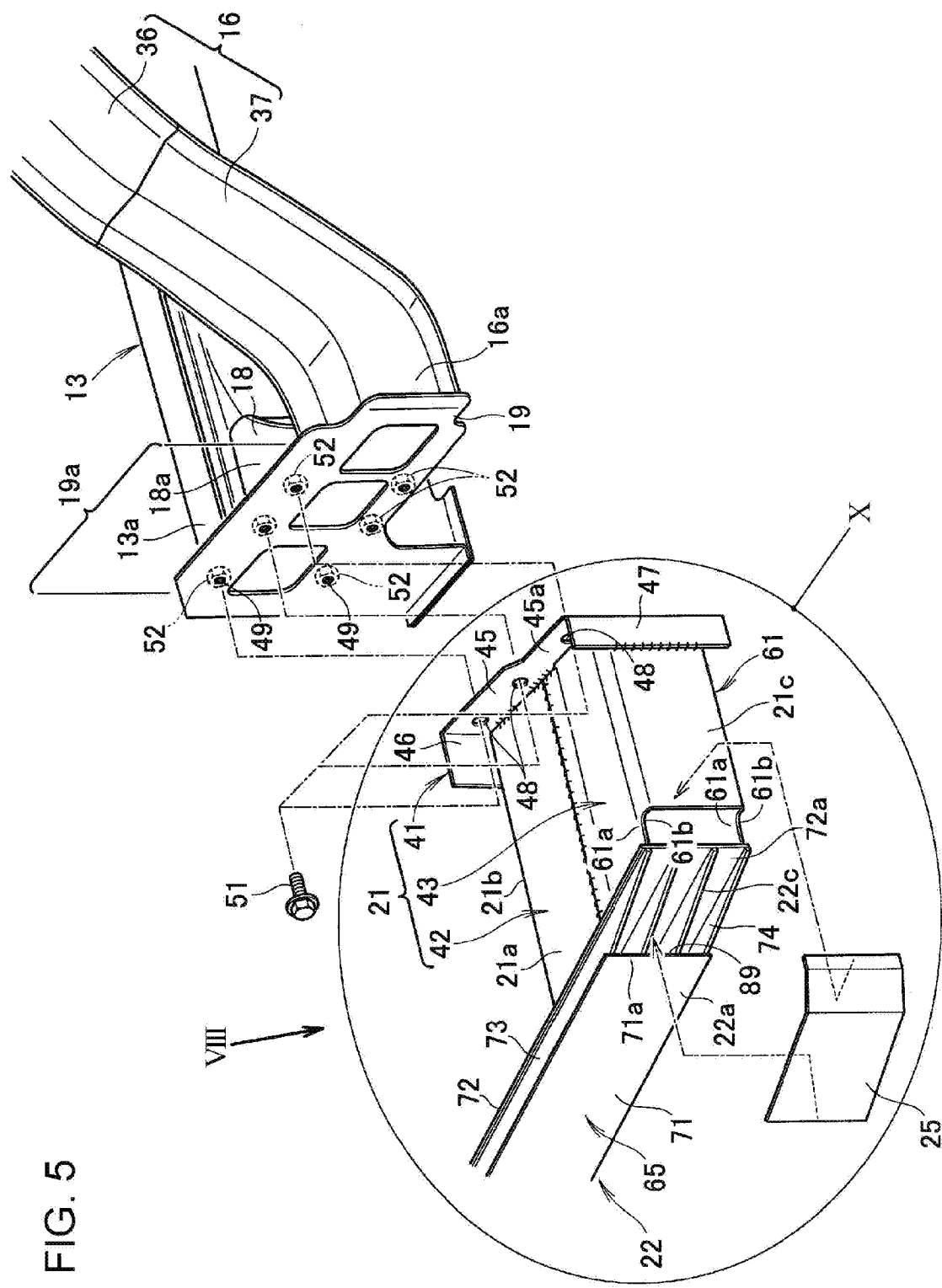
FIG. 5 is an exploded perspective view of the vehicle body front structure of FIG. 4.

As illustrated in FIGS. 4 and 5, the left shock absorbing member 21 includes a coupling plate 41, a first shock absorbing member 42, and a second shock absorbing member 43. The coupling plate 41 is attached to the left attachment member 19 from the front side of the vehicle body. The first shock absorbing member 42 is attached on the inner side of the coupling plate 41 in the vehicle width direction. The second shock absorbing member 43 is attached on the outer side of the coupling plate 41 in the vehicle width direction. That is, the second shock absorbing member 43 is provided on the outer side of the first shock absorbing member 42 in the vehicle width direction. The first shock absorbing member 42 and the second shock absorbing member 43 will be described in detail later.

The coupling plate 41 is formed by extruding a light metal material such as an aluminum alloy. Specifically, the coupling plate 41 includes a fastening plate 45, an inner flange 46, and an outer flange 47. The fastening plate 45 is fastened to the left attachment member 19. The inner flange 46 extends from an inner side of the fastening plate 45 toward the front of the vehicle body. The outer flange 47 extends from an outer side of the fastening plate 45 toward the front of the vehicle body. The fastening plate 45 has a substantially rectangular shape in front view and has a plurality of insertion holes 48 at its upper portion 45a and lower portion 45b (see FIG. 8). The diameter of the insertion holes 48 is hole diameters d1 (see FIG. 6A).

Figure 6A:
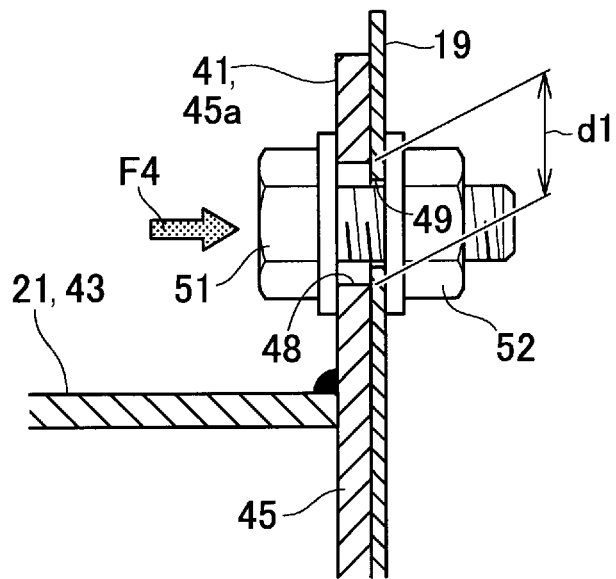
FIG. 6A is a sectional view taken along line VIA-VIA of FIG. 4.

As illustrated in FIG. 6A, bolts (fastening members) 51 are inserted through the insertion holes 48 and attachment holes 49 of the left attachment member 19 and fastened to nuts (fastening members) 52. By fastening the bolts 51 to the nuts 52, fastening forces F4 (referred to as "fastening surface pressures" hereafter) of the bolts 51 and the nuts 52 act on both the surfaces of the fastening plate 45. Thus, the fastening plate 45 is fastened to an attachment part 19a in the inner portion of the left attachment member 19 in the vehicle width direction with the plurality of bolts 51 and the plurality of nuts 52.

As illustrated in FIG. 4, an inner half of the fastening plate 45 is disposed in front of the front end portion 13a of the left front side frame 13 in the vehicle front-rear direction. Furthermore, an outer half of the fastening plate 45 is disposed in front of the front end portion 18a of the left coupling bracket 18 in the vehicle front-rear direction. That is, the fastening plate 45 is fastened to the front end portion 13a of the left front side frame 13 and the front end portion 18a of the left coupling bracket 18 through the left attachment member 19 with the plurality of bolts 51 and the plurality of nuts 52.

A rear end portion 42a of the first shock absorbing member 42 is connected by welding to the inner half of the fastening plate 45 from the front of the vehicle body. That is, the first shock absorbing member 42 projects from the inner half of the fastening plate 45 (that is, the front end portion 13a of the left front side frame 13) toward the front of the vehicle body (see also FIG. 3). Furthermore, a rear end portion 43a of the second shock absorbing member 43 is connected by welding to the outer half of the fastening plate 45 from the front of the vehicle body. That is, the second shock absorbing member 43 projects from the outer half of the fastening plate 45 (that is, the front end portion 18a of the left coupling bracket 18) toward the front of the vehicle body (see also FIG. 3).

Here, the second shock absorbing member 43 of the left shock absorbing member 21 extends further toward the outside than the left front side frame 13 in the vehicle width direction. Accordingly, in the event of a small overlap crash, the second shock absorbing member 43 extending outward in the vehicle width direction can be axially collapsed by the shock load F1. This can increase an absorption amount of shock energy.

Furthermore, with the second shock absorbing member 43 extending outward in the vehicle width direction, a large sectional area of the left shock absorbing member 21 is ensured (see also FIG. 7). Thus, in the event of a minor crash at the front of the vehicle, the left shock absorbing member 21 can be entirely axially collapsed. Thus, shock energy can be preferably absorbed. This can ensure shock absorbing performance against a minor crash at the front of the vehicle without deformation of the left front side frame 13. A minor crash at the front of the vehicle refers to, for example, a crash at the speed of 15 km/h or lower (a so-called full flat crash).

Furthermore, also in the event of a typical full lap crash or an offset crash (that is, a 30 to 50% overlap crash), the left shock absorbing member 21 is entirely axially collapsed. Thus, shock energy can be preferably absorbed.

Furthermore, the inner flange 46 extends from the inner side of the fastening plate 45 toward the front of the vehicle body so as to have a plate shape along an inner side wall 21*b* of the left shock absorbing member 21 (see also FIG. 3). The inner side wall 21*b* of the left shock absorbing member 21 is an inner side wall of the first shock absorbing member 42. The extended inner flange 46 is connected by welding to the inner side wall 21*b* of the left shock absorbing member 21.

Furthermore, the outer flange 47 extends from the outer side of the fastening plate 45 toward the front of the vehicle body so as to have a plate shape along the outer side wall 21*c* of the left shock absorbing member 21. The outer side wall 21*c* of the left shock absorbing member 21 is an outer side wall of the second shock absorbing member 43. The extended outer flange 47 is connected by welding to the outer side wall 21*c* of the left shock absorbing member 21. Thus, the left shock absorbing member 21 (that is, the first shock absorbing member 42 and the second shock absorbing member 43) is firmly supported at the coupling plate 41 by the inner flange 46 and the outer flange 47.

As illustrated in FIG. 2, similarly to the left shock absorbing member 21, a first shock absorbing member 42 and a second shock absorbing member 43 of the right shock absorbing member 21 are firmly supported at a coupling plate 41 by an inner flange 46 and an outer flange 47. That is, when the tensile force F3 toward the small overlap crash side acts on the bumper beam 22, connection between the inner flange 46 and an inner side wall 21*b* of the right shock absorbing member 21 is maintained. Also, connection between the outer flange 7 and an outer side wall 21*c* of the right shock absorbing member 21 is maintained.

Accordingly, the tensile force F3 acting on the bumper beam 22 can be applied to the right front side frame 13 through the right shock absorbing member 21 and a right attachment member 19. Thus, shock energy can be preferably absorbed by utilizing resistance against deformation of the right front side frame 13 toward the small overlap crash side. Here, the resistance against deformation refers to a force that suppresses deformation of the right front side frame 13.

Next, the reason why the insertion holes 48 of the coupling plate 41 have the hole diameters d1 is described in detail with reference to FIGS. 2, 5, 6A, and 6B. As illustrated in FIGS. 5 and 6A, the bolts 51 are inserted through the insertion holes 48 of the coupling plate 41 on the left side and the attachment holes 49 of the left attachment member 19 and fastened to the nuts 52. By fastening the bolts 51 to the nuts 52, the fastening surface pressures F4 as the fastening forces of the bolts 51 and the nuts 52 act on both the surfaces of the coupling plate 41. Accordingly, the coupling plate 41 on the left side is attached to the left attachment member 19 by the fastening surface pressures F4 of the plurality of the bolts 51 and the plurality of the nuts 52.

Figure 6B:
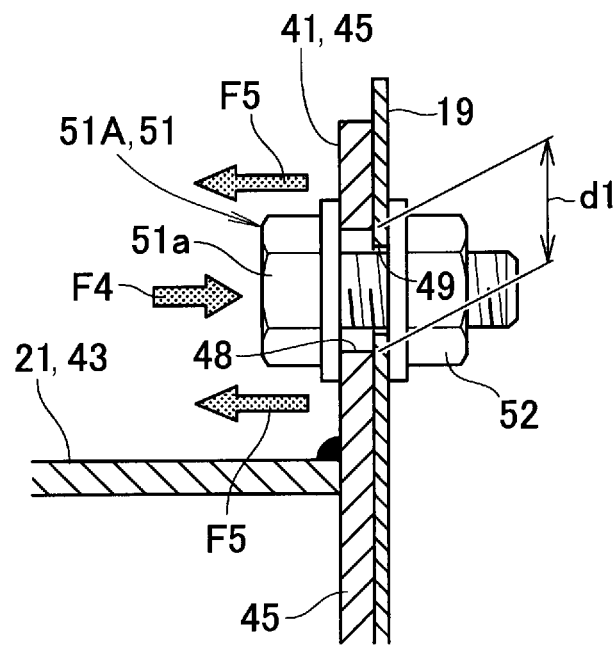
FIG. 6B is a sectional view taken along line VIB-VIB of FIG. 2.

Furthermore, as illustrated in FIG. 2, as is the case with the coupling plate 41 on the left side, the coupling plate 41 on the right side is attached to the right attachment member 19 by the fastening surface pressures F4 of a plurality of the bolts 51 and a plurality of the nuts 52 (see FIG. 6B). In this state, the shock load F1 is input to the left end portion 22*a* of the bumper beam 22 due to a small overlap crash, and the tensile force F3 toward the small overlap crash side acts on the bumper beam 22. The tensile force F3 is transferred to the coupling plate 41 on the right side through the first shock absorbing member 42 and the second shock absorbing member 43 of the right shock absorbing member 21. Thus, tensile forces F5 (see FIG. 6B) acts on heads 51*a* of the bolts 51 from the coupling plate 41 on the right side.

As illustrated in FIG. 6B, the fastening surface pressures F4 of the bolts 51 and the nuts 52 vary depending on the size of the hole diameters d1 of insertion holes 48. That is, as the hole diameters d1 of the insertion holes 48 increase, the fastening surface pressures F4 reduce. As the hole diameters d1 of the insertion holes 48 reduce, the fastening surface pressures F4 increase. The hole diameters d1 of the insertion holes 48 are set so that the fastening surface pressures F4 are smaller than the tensile forces F5.

As illustrated in FIG. 2, when the tensile force F3 acts on the bumper beam 22, the large tensile forces F5 (see FIG. 6B) act on a head 51*a* of a bolt 51 positioned on the outer side in the vehicle width direction (referred to as "outer bolt 51A" hereafter) among the plurality of bolts 51. Thus, as illustrated in FIG. 6B, in the event of a small overlap crash at the left end portion 22*a* of the bumper beam 22, one of the insertion holes 48 of the coupling plate 41 on the right side can be removed from the outer bolt 51A among the plurality of bolts 51.

This causes, as illustrated in FIG. 2, the right shock absorbing member 21 (including the coupling plate 41 on the right side) to be diagonally moved toward the small overlap crash side. Thus, application of excessive loads to connecting portions of a right inner coupling member 24, a right outer coupling member 25, the inner flange 46, and the outer flange 47 can be prevented. Here, the right inner coupling member 24 and the left inner coupling member 24 are substantially left-right symmetry, and the right outer coupling member 25 and the left outer coupling member 25 are substantially left-right symmetry. Thus, detailed description of the coupling members 24 and 25 is omitted.

Meanwhile, the coupling plate 41 on the right side is maintained in a state in which the coupling plate 41 on the right side is fastened to a front end portion 13*a* of the right front side frame 13 through the right attachment member 19 with the remaining bolts 51. Accordingly, the tensile force F3 toward the small overlap crash side acting on the bumper beam 22 can be applied to the right front side frame 13. Thus, shock energy can be preferably absorbed by utilizing the resistance against deformation of the right front side frame 13, and accordingly, the shock absorbing performance for the shock energy can be ensured.

As illustrated in FIG. 4, the inner flange 46 extends along the inner side wall 21*b* of the left shock absorbing member 21 so as to have a plate shape (see also FIG. 3). Furthermore, the outer flange 47 extends along the outer side wall 21*c* of the left shock absorbing member 21 so as to have a plate shape. Accordingly, in the event of a minor crash at the front of the vehicle, when the left shock absorbing member 21 is axially collapsed toward the rear of the vehicle body, the inner flange 46 and the outer flange 47 can be preferably deformed in the vehicle width direction. Thus, the left shock absorbing member 21 can be axially collapsed entirely from the front end portion 21*a*, and accordingly, shock energy generated by the minor crash can be preferably absorbed.

As illustrated in FIG. 7, the first shock absorbing member 42 is formed by extruding a light metal material such as an aluminum alloy so that the first shock absorbing member 42 extends in the vehicle front-rear direction while having a uniform sectional shape. Specifically, the first shock absorbing member 42 includes a first outer peripheral wall structure 55 and a first partition structure 56. The first outer peripheral wall structure 55 is formed to have a closed section having a substantially rectangular shape in section. The first partition structure 56 partitions the interior of the first partition structure 56 into a plurality of small sections 57. The first partition structure 56 has, for example, a substantially crisscross shape (that is, a grid shape) in section.

That is, the first shock absorbing member 42 has a closed section formed by the first outer peripheral wall structure 55, and this closed section is partitioned by the first partition structure 56 into the plurality of small sections 57 so as to have a grid shape. Accordingly, the first shock absorbing member 42 is formed as the closed section having a substantially so-called matrix shape. A bead 58 (see FIG. 9) vertically extends on an inner wall front portion 21d of the inner side wall 21b of the first outer peripheral wall structure 55 (that is, the inner side wall of the left shock absorbing member 21). The second shock absorbing member 43 is connected by welding to the outer side of the first outer peripheral wall structure 55 in the vehicle width direction. Accordingly, it is ensured that the left shock absorbing member 21 has a large section.

As is the case with the first shock absorbing member 42, the second shock absorbing member 43 is formed by extruding a light metal material such as an aluminum alloy so that the second shock absorbing member 43 extends in the vehicle front-rear direction while having a uniform sectional shape. Specifically, the second shock absorbing member 43 includes a second outer peripheral wall structure 61 and a second partition structure 62. The second outer peripheral wall structure 61 is formed to have a U-shape in section. The second partition structure 62 partitions the interior of the second outer peripheral wall structure 61 into small sections 63.

The second outer peripheral wall structure 61 has a substantially U-shape in section so as to be open on the inner side in the vehicle width direction. Furthermore, as illustrated in FIG. 5, the second outer peripheral wall structure 61 has an upper recess 61b and a lower recess 61b The upper recess 61b is formed in an upper front outer projecting angle portion 61a. The lower recess 61b is formed in a lower front outer projecting angle portion 61a.

Referring back to FIG. 7, an upper inner end portion 61c of the second outer peripheral wall structure 61 is connected by welding to an upper outer end portion 55a of the first outer peripheral wall structure 55. Furthermore, a lower inner end portion 61c of the second outer peripheral wall structure 61 is connected by welding to a lower outer end portion 55a of the first outer peripheral wall structure 55. In this connected state, the interior of the second outer peripheral wall structure 61 is partitioned into inner and outer small sections 63 by the second partition structure 62. The second partition structure 62 has a substantially I shape in section. Accordingly, a closed section which has the small sections 63 arranged side by side is formed by the second shock absorbing member 43 and an outer side wall 55b of the first outer peripheral wall structure 55.

As described above, with the large section of the left shock absorbing member 21 and the partitioning of the closed section of the left shock absorbing member 21 into the plurality of small sections 57 and 63, the strength of the left shock absorbing member 21 is preferably increased. Thus, the energy absorption amount of the left shock absorbing member 21 can be increased by the axial collapse of the left shock absorbing member 21 having high strength caused by a shock load applied due to a small overlap crash or a minor crash at the front of the vehicle.

Furthermore, the closed section of the first shock absorbing member 42 extends in the vehicle front-rear direction while having a uniform shape. Likewise, the closed section of the second shock absorbing member 43 is formed so as to extend in the vehicle front-rear direction while having a uniform shape. Thus, the first shock absorbing member 42 and the second shock absorbing member 43 can be formed by, for example, extruding light metal materials such as aluminum alloys. This can increase ease of production of the left shock absorbing member 21.

Figure 8:
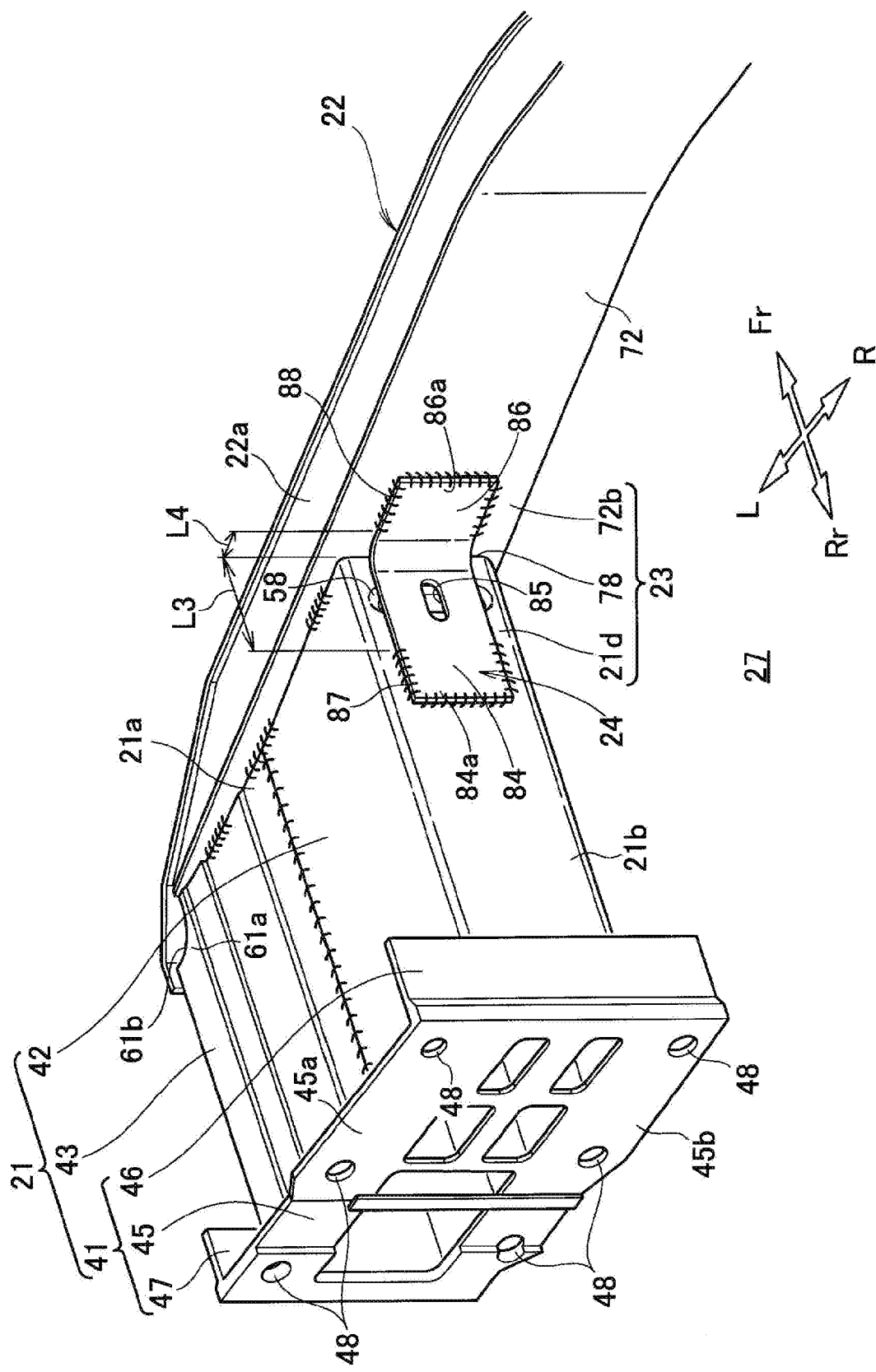
FIG. 8 is a view seen in an arrow VIII direction of FIG. 5.

As illustrated in FIGS. 2 and 8, the bumper beam 22 is spanned between the front end portion 21a of the left shock absorbing member 21 and the front end portion 21a of the right shock absorbing member 21, extending in the vehicle width direction. Specifically, a beam rear wall (rear wall) 72 of the left end portion (end portion) 22a of the bumper beam 22 is connected by welding to the front end portion 21a of the left shock absorbing member 21. Also, a beam rear wall 72 of a right end portion (opposite end portion side) 22b of the bumper beam 22 is connected by welding to the front end portion 21a of the right shock absorbing member 21 as is the case with the left end portion 22a of the bumper beam 22. In this state, the left end portion 22a of the bumper beam 22 extends in a direction that is outward in the vehicle width direction and diagonally rearward in the vehicle front-rear direction. Likewise, a right end portion 22b of the bumper beam 22 extends in a direction that is outward in the vehicle width direction and diagonally rearward in the vehicle front-rear direction.

Figure 9:
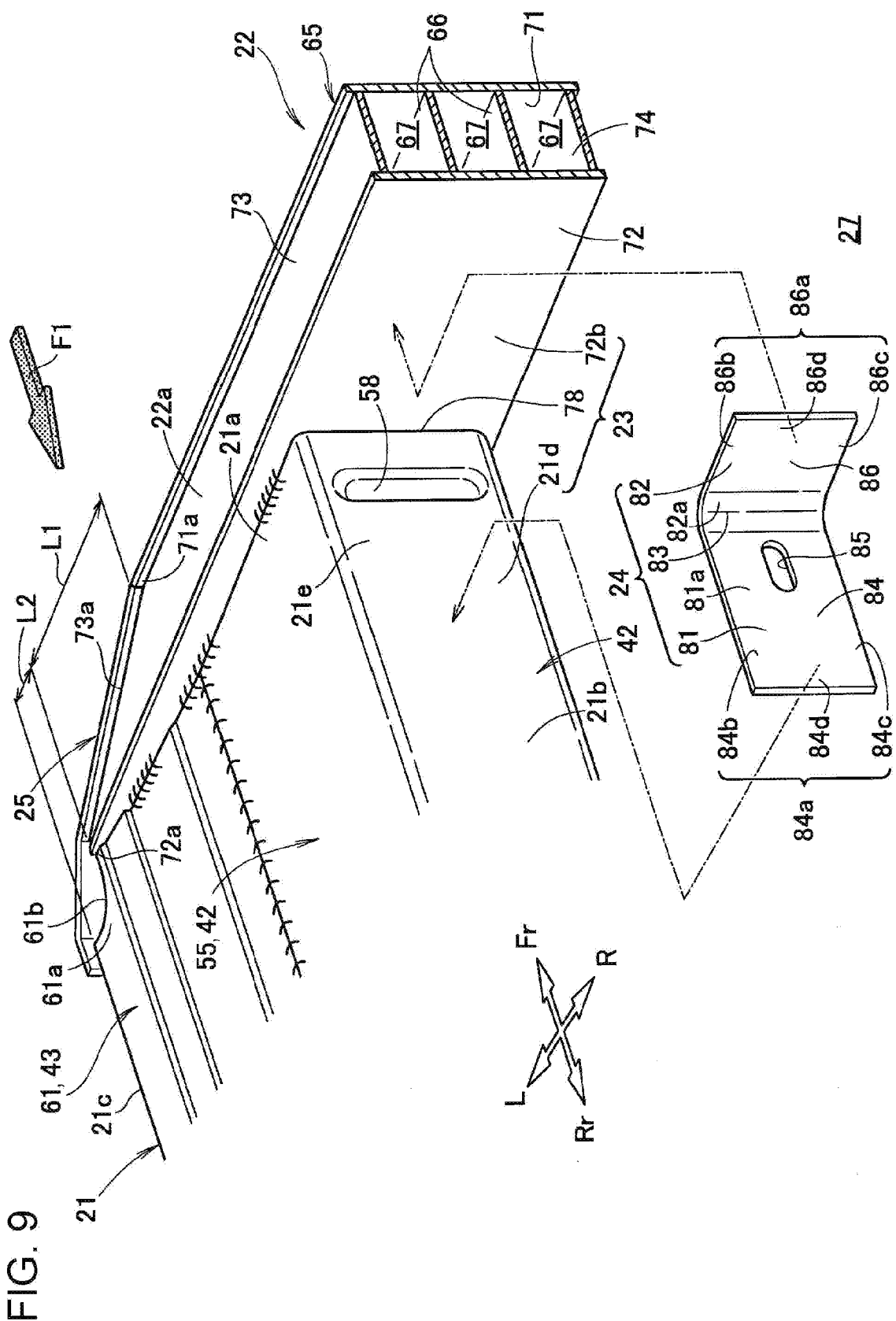
FIG. 9 is an exploded perspective view of the vehicle body front structure of FIG. 8.

As illustrated in FIG. 9, the bumper beam 22 includes a beam outer peripheral wall structure 65 and a plurality of beam partitions (for example, upper and lower beam partitions) 66. The beam outer peripheral wall structure 65 is formed to have a closed section having a substantially rectangular shape in section. The beam partitions 66 partition the interior of the beam outer peripheral wall structure 65 into a plurality of small sections 67. The beam outer peripheral wall structure 65 includes a beam front wall 71, the beam rear wall 72, a beam top portion 73, and a beam bottom portion 74. The beam front wall 71 is provided on the front side in the vehicle front-rear direction. The beam rear wall 72 is provided to the rear of the beam front wall 71 in the vehicle front-rear direction. The beam top portion 73 couples an upper end portion of the beam front wall 71 and an upper end portion of the beam rear wall 72 to each other. The beam bottom portion 74 couples a lower end portion of the beam front wall 71 and a lower end portion of the beam rear wall 72 to each other.

With the beam front wall 71, the beam rear wall 72, the beam top portion 73, and the beam bottom portion 74, the beam outer peripheral wall structure 65 has a closed section having a substantially rectangular shape in section. The upper and lower beam partitions 66 are provided in the beam outer peripheral wall structure 65 so as to be spaced from each other in the up-down direction and substantially parallel to each other. Thus, the interior of the beam outer peripheral wall structure 65 is partitioned in the up-down direction into the plurality of small sections 67 by the upper and lower beam partitions 66. That is, the bumper beam 22 has the closed section that has the plurality of small sections 67. Accordingly, the bumper beam 22 is formed as the closed section having the small sections 67 stacked one on top of another. This can preferably increase the strength of the bumper beam 22.

Figure 10:
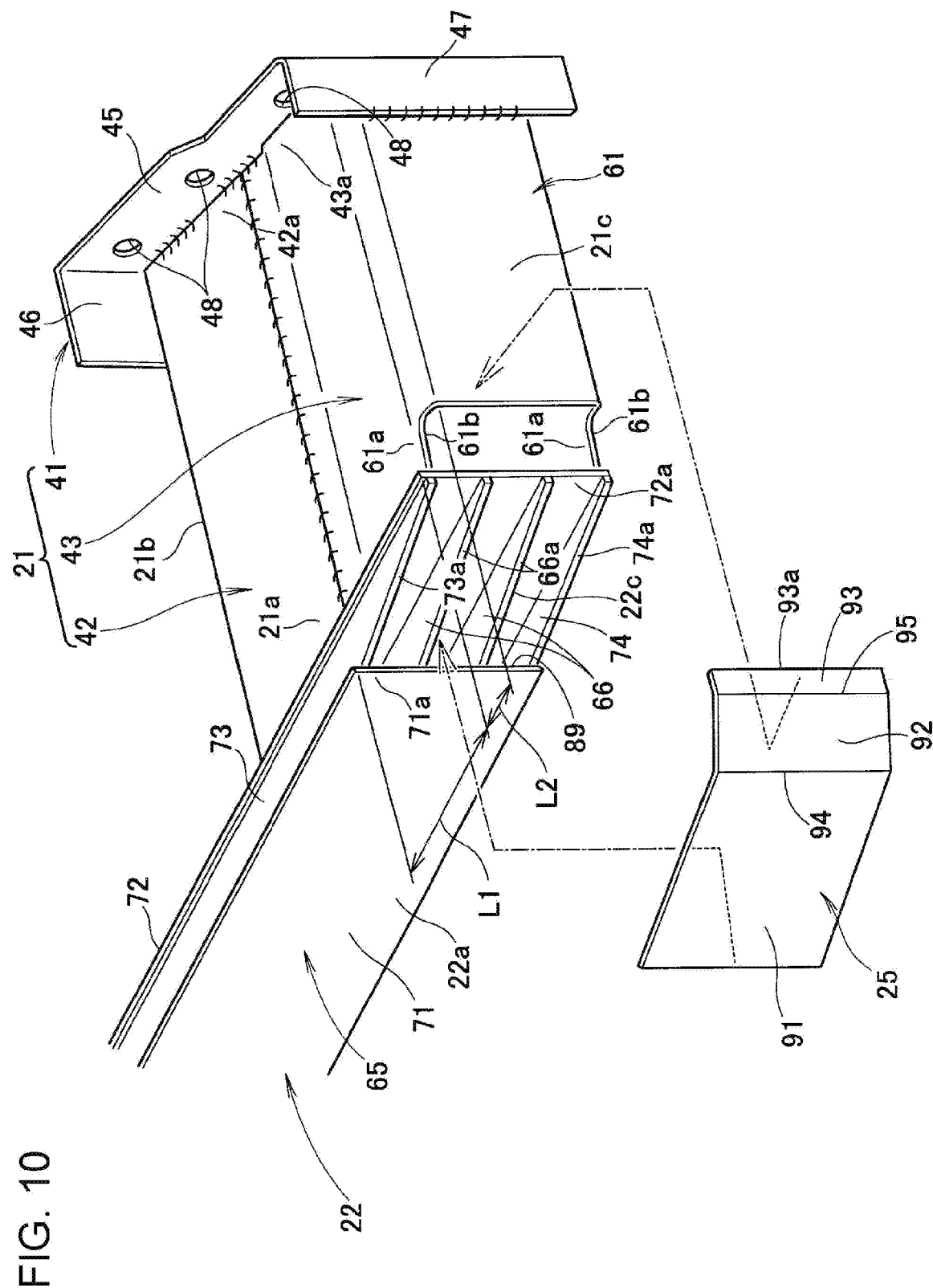
FIG. 10 is an enlarged view of part X of FIG. 5.

As illustrated in FIG. 10, a left edge 71a of the beam front wall 71 is disposed further to the inside than a left edge 72a of the beam rear wall 72 by a width-direction dimension L1 in the vehicle width direction. Furthermore, the left edge 72a of the beam rear wall 72 is disposed further to the inside than the outer side wall 21c of the left shock absorbing member 21 by a width-direction dimension L2 in the vehicle width direction. Furthermore, a left front end portion 73a of the beam top portion 73 and a left front end portion 74a of the beam bottom portion 74 are diagonally shaped. Likewise, a left front end portion 66a of the upper beam partition 66 and a left front end portion 66a of the lower beam partition 66 are diagonally shaped. That is, the left end portions 73a, 74a, 66a, and 66a extends from the left edge 71a of the beam front wall 71 toward the left edge 72a of the beam rear wall 72 in a direction that is outward in the vehicle width direction and diagonally rearward in the vehicle front-rear direction.

Thus, a front surface 22c of the left end portion 22a of the bumper beam 22 is open so as to face in a direction that is outward in the vehicle width direction and diagonally rearward in the vehicle front-rear direction. The opened front surface 22c is closed by the left outer coupling member 25 (to be described later; also see FIG. 4). As has been described, the bumper beam 22 has the closed section that has the plurality of small sections 67 (see FIG. 9), and the front surface 22c of the bumper beam 22 is closed by the left outer coupling member 25. This can preferably increase the strength of the left end portion 22a of the bumper beam 22.

Thus, as illustrated in FIG. 9, the shock load F1 applied due to a small overlap crash can be supported by the left end portion 22a of the bumper beam 22. By supporting the shock load F1, the shock load F1 input to the left end portion 22a can be transferred to the entirety of the front end portion 21a of the left shock absorbing member 21. By transferring the shock load F1 to the entirety of the front end portion 21a, the entirety of the left shock absorbing member 21 can be axially collapsed toward the rear of the vehicle body by the transferred shock load F1. This can increase the absorption amount of the shock energy.

Here, as is the case with the front surface 22c of the left end portion 22a of the bumper beam 22, a front surface 22d of a right end portion 22b of the bumper beam 22 of FIG. 2 is open so as to face in a direction that is outward in the vehicle width direction and diagonally rearward in the vehicle front-rear direction. The opened front surface 22d is closed by the right outer coupling member 25 (to be described later). This can preferably increase the strength of the right end portion 22b of the bumper beam 22 as is the case with the left end portion 22a.

As illustrated in FIG. 9, the left shock absorbing member 21 extends in the vehicle front-rear direction. Furthermore, the bumper beam 22 extends in the vehicle width direction. Accordingly, the left recessed angle portion 23 is formed to have a recessed shape in plan view (see also FIG. 3) by connecting the front end portion 21a of the left shock absorbing member 21 to the beam rear wall 72 of the left end portion 22a of the bumper beam 22.

The left recessed angle portion 23 has a front portion of the inner side wall 21b of the left shock absorbing member 21 (referred to as "inner wall front portion" hereafter) 21d, a left portion of the beam rear wall 72 (referred to as "rear wall left portion" hereafter) 72b, and an intersection 78 where the inner wall front portion 21d and the rear wall left portion 72b intersect each other. With the inner wall front portion 21d, the rear wall left portion 72b, and the intersection 78, the left recessed angle portion 23 has a recessed shape in plan view. The left inner coupling member 24 is disposed in the left recessed angle portion 23 from the engine room 27 side.

The inner wall front portion 21d includes the bead (fragile portion) 58 at its front portion 21e. When the left inner coupling member 24 is disposed, the bead 58 is disposed between the intersection 78 and a first end portion 84 (to be described later) of the left inner coupling member 24. Specifically, the bead 58 is formed from the front portion 21e of the inner wall front portion 21d to an inner portion 59 of the first shock absorbing member 42 so as to have a recessed shape (see also FIG. 11) and vertically extends in the up-down direction. Thus, in the event of, for example, a small overlap crash or a minor crash at the front of the vehicle, the left shock absorbing member 21 can be preferably axially collapsed from the front portion 21e of the inner wall front portion 21d starting from the bead 58 toward the rear of the vehicle body.

The left inner coupling member 24 is an inner end plate formed by bending a belt-shaped metal plate into a substantially L shape. Thus, a load uniformly transferred through the belt-shaped left inner coupling member 24 in a single direction can be dispersed. That is, the belt-shaped left inner coupling member 24 has a reduced strength against a compressive load and a lateral load, thereby suppressing concentration of the load. In contrast, the left inner coupling member 24 has a high strength against a tensile load.

Specifically, the left inner coupling member 24 includes a first inner coupling portion 81, a second inner coupling portion 82, and an inner bent portion 83. The first inner coupling portion 81 is bent so as to extend along the inner wall front portion 21d. The second inner coupling portion 82 is bent so as to extend along the rear wall left portion 72b. The first inner coupling portion 81 and the second inner coupling portion 82 are coupled to each other so as to intersect each other at the inner bent portion 83. With the first inner coupling portion 81, the second inner coupling portion 82, and the inner bent portion 83, the left inner coupling member 24 has a substantially L shape.

The first inner coupling portion 81 has a substantially rectangular shape in side view and has an opening 85 that extends in the vehicle front-rear direction in the center of a front half portion 81a in the up-down direction. The first inner coupling portion 81 extends from the inner bent portion 83 toward the rear of the vehicle body along the inner wall front portion 21d. The first end portion (free end) 84 of the left inner coupling member 24 is formed in a rear half portion of the first inner coupling portion 81.

The first end portion 84 of the left inner coupling member 24 includes a first upper edge portion 84b, a first lower edge portion 84c, and a first rear edge portion 84d. The first upper edge portion 84b extends in the vehicle front-rear direction along the inner wall front portion 21d. The first lower edge portion 84c disposed below the first upper edge portion 84b extends in the vehicle front-rear direction along the inner wall front portion 21d. The first rear edge 84d couples a rear end of the first upper edge portion 84b and a rear end of the first lower edge portion 84c to each other. With the first upper edge portion 84b, the first lower edge portion 84c, and the first rear edge portion 84d, a periphery 84a of the first end portion 84 has a substantially U shape in side view, which are portions located away from the intersection 78 and are the only portions of the coupling member 24 that fix the first end portion 84 to the inner wall front portion 21d.

The second inner coupling portion 82 has a substantially rectangular shape in front view and extends from the inner bent portion 83 to the right in the vehicle width direction along the rear wall left portion 72b. A second end portion (free end) 86 of the left inner coupling member 24 is formed by a portion of the second inner coupling portion 82 other than a proximal region 82a in the proximity of the inner bent portion 83. That is, the left inner coupling member 24 has the first end portion 84 and the second end portion 86 as free ends at both the end portions thereof.

The second end portion 86 of the left inner coupling member 24 includes a second upper edge portion 86b, a second lower edge portion 86c, and a second right edge 86d. The second upper edge portion 86b extends in the vehicle width direction along the rear wall left portion 72b. The second lower edge portion 86c disposed below the second upper edge portion 86b extends in the vehicle width direction along the rear wall left portion 72b. The second right edge 86d couples a right end of the second upper edge portion 86b and a right end of the second lower edge portion 86c to each other. With the second upper edge portion 86b, the second lower edge portion 86c, and the second right edge 86d, a periphery 86a of the second end portion 86 has a substantially U shape in side view, which are portions located away from the intersection 78, and are the only portions of the coupling member 24 that fix the second end portion 86 to the rear wall left portion 72b.

With the left inner coupling member 24 disposed at the left recessed angle portion 23, the inner bent portion 83 is positioned so as to face the intersection 78. Also, the first inner coupling portion 81 is disposed so as to be in contact with the inner wall front portion 21d. Also, the second inner coupling portion 82 is disposed so as to be in contact with the rear wall left portion 72b. In this state, the first upper edge portion 84b, the first lower edge portion 84c, and the first rear edge 84d are one-side welded to the inner wall front portion 21d from the inner side in the vehicle width direction (that is, from the right side) by laser welding, metal inert gas (MIG) welding, or the like. A first connecting portion 87 is formed so as to have a substantially U shape (that is, substantially C shape) by the one-side welding (see FIG. 8).

As illustrated in FIG. 8, the periphery 84a of the first end portion 84 is connected along a substantially U shape to the inner wall front portion 21d by the first connecting portion 87. The first connecting portion 87 is connected with a first spacing L3 (also see FIG. 11) set between the intersection 78 and the first connecting portion 87. Thus, the first end portion 84 is firmly connected to the inner wall front portion 21d by the first connecting portion 87. The bead 58 is positioned between the intersection 78 and the first end portion 84.

Furthermore, as illustrated in FIG. 9, the second upper edge portion 86b, the second lower edge portion 86c, and the second right edge 86d are one-side welded to the rear wall left portion 72b from the rear side of the vehicle body by laser welding, metal inert gas (MIG) welding, or the like. A second connecting portion 88 is formed so as to have a substantially U shape (that is, substantially C shape) by the one-side welding (see FIG. 8).

As illustrated in FIG. 8, the periphery 86a of the second end portion 86 is connected along a substantially U shape to the rear wall left portion 72b by the second connecting portion 88. The second connecting portion 88 is connected with a second spacing L4 (also see FIG. 11) set between the intersection 78 and the second connecting portion 88. Thus, the second end portion 86 is firmly connected to the rear wall left portion 72b by the second connecting portion 88.

Figure 11:
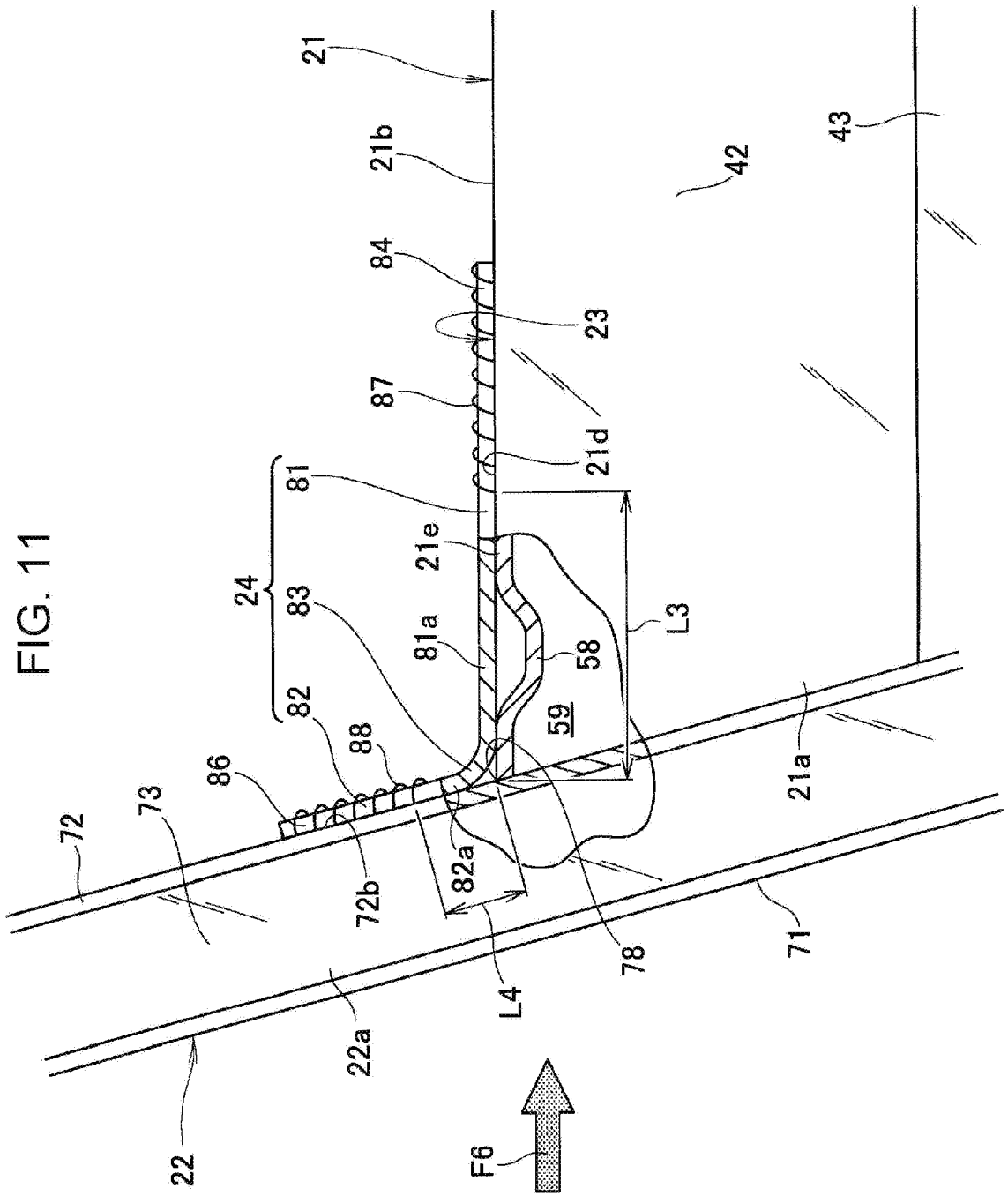
FIG. 11 is an enlarged view of part XI of FIG. 3.

As illustrated in FIG. 11, the first spacing L3 is formed between the intersection 78 and the first connecting portion 87, and the bead 58 is formed in the first spacing L3. Furthermore, the second spacing L4 is formed between the intersection 78 and the second connecting portion 88. That is, a central portion of the left inner coupling member 24 is maintained in a state in which the central portion of the left inner coupling member 24 is not connected to the intersection 78 and the proximity of the intersection 78. The central portion of the left inner coupling member 24 has the front half portion 81a of the first inner coupling portion 81, the inner bent portion 83, and the proximal region 82a of the second inner coupling portion 82 in the proximity of the inner bent portion 83.

Thus, an increase of the strength of the intersection 78 (that is, the left recessed angle portion 23) more than required can be suppressed. This allows the left shock absorbing member 21 to be preferably axially collapsed from the intersection 78 of the left recessed angle portion 23 (specifically, the front portion 21e of the inner wall front portion 21d) toward the rear of the vehicle body by a shock load F6 input to the left shock absorbing member 21 in the event of a frontal (flat) crash such as a minor crash at the front of the vehicle. That is, inhibition of the shock absorbing performance of the left shock absorbing member 21 can be suppressed. It is noted that the positions of the first end portion 84 and the second end portion 86 are selected so that, in the event of a small overlap crash, relative displacement of the connecting portion (that is, the welded portion) where the left end portion 22a of the bumper beam 22 and the front end portion 21a of the left shock absorbing member 21 are connected to each other can be minimized.

Furthermore, the bead 58 is formed in the front portion 21e of the inner wall front portion 21d (that is, the front end portion 21a of the left shock absorbing member 21), and the bead 58 is disposed in the first spacing L3. That is, the left inner coupling member 24 is maintained in a state in which the left inner coupling member 24 is not connected to the bead 58. Thus, the left shock absorbing member 21 can be preferably axially collapsed entirely from the front portion 21e of the inner wall front portion 21d starting from the bead 58 toward the rear of the vehicle body by the shock load F6 applied due to a minor crash at the front of the vehicle.

Furthermore, the left inner coupling member 24 is formed by bending a belt-shaped metal plate into a substantially L shape. The strength of the belt-shaped metal plate against a compressive load is reduced. In addition, the front half portion 81a of the first inner coupling portion 81 has the opening 85 (see FIG. 8). Thus, when the left shock absorbing member 21 is axially collapsed, the left inner coupling member 24 can preferably undergo compressive deformation so as to more preferably axially collapse the left shock absorbing member 21 toward the rear of the vehicle body. As described above, shock energy can be preferably absorbed by preferably axially collapsing the entirety of the left shock absorbing member 21 in the event of a minor crash at the front of the vehicle. Accordingly, the shock absorption performance can be ensured.

Here, the first end portion 84 of the left inner coupling member 24 is firmly connected to the inner wall front portion 21d of the left shock absorbing member 21. Furthermore, the second end portion 86 of the left inner coupling member 24 is firmly connected to the rear wall left portion 72b of the bumper beam 22. Thus, the inner wall front portion 21d of the left shock absorbing member 21 and the rear wall left portion 72b of the bumper beam 22 are firmly coupled to each other by the left inner coupling member 24. Furthermore, the central portion of the left inner coupling member 24 is maintained in a state in which the central portion of the left inner coupling member 24 is not connected to the intersection 78 and the proximity of the intersection 78.

Likewise, as illustrated in FIG. 2, an inner wall front portion 21d of the right shock absorbing member 21 and a rear wall right portion 72c of the bumper beam 22 are firmly coupled to each other by the right inner coupling member 24. Furthermore, a central portion of the right inner coupling member 24 is maintained in a state in which the central portion of the right inner coupling member 24 is not connected to an intersection 78 and the proximity of the intersection 78.

In this state, as illustrated in FIG. 2, at an initial stage of a small overlap crash, a component force F2 of the shock load F1 laterally (that is, inward in the vehicle width direction) acts on the bumper beam 22. Thus, it is thought that cracking may occur in the intersection (that is, connecting portion) 78 where the inner wall front portion 21d of the right shock absorbing member 21 and the rear wall right portion 72c of the bumper beam 22 intersect each other.

In this case, the central portion of the right inner coupling member 24 (that is, a portion maintained in a state in which the right inner coupling member 24 is not connected to the intersection 78 and the proximity of the intersection 78) can be preferably bent. Accordingly, concentration of stress in a first connecting portion 87 and a second connecting portion 88 of the right inner coupling member 24 can be prevented. This suppresses breakage of the first connecting portion 87 and the second connecting portion 88, thereby maintaining coupling (connection) between the right end portion 22b of the bumper beam 22 and the front end portion 21a of the right shock absorbing member 21.

Furthermore, even when, for example, a connecting portion between the right end portion 22b of the bumper beam 22 and the front end portion 21a of the right shock absorbing member 21 is broken, the right inner coupling member 24 that has a low strength against the lateral component force F2 can suppress concentration of the load. Thus, the right inner coupling member 24 remains unbroken even after the lateral component force F2 has been input, thereby coupling (connecting) between the right end portion 22b of the bumper beam 22 and the front end portion 21a of the right shock absorbing member 21 is maintained.

In this state, when the small overlap crash advances, the left shock absorbing member 21 is axially collapsed toward the rear of the vehicle body due to the shock load F1. At the same time, the tensile force F3 toward the small overlap crash side acts on the bumper beam 22. Here, the right end portion 22b of the bumper beam 22 and the front end portion 21a of the right shock absorbing member 21 are coupled to each other by the right inner coupling member 24. Accordingly, the tensile force F3 can act on the right front side frame 13 through the right end portion 22b of the bumper beam 22 and the right shock absorbing member 21. Thus, shock energy can be preferably absorbed by utilizing resistance against deformation of the right front side frame 13 toward the small overlap crash side.

as illustrated in FIGS. 4 and 10, the left outer coupling member 25 is connected to the left end portion 22a of the bumper beam 22 and the outer side wall 21c of the left shock absorbing member 21. The left outer coupling member 25 is an outer end plate formed by bending a belt-shaped metal plate along a first outer bent portion 94 and a second outer bent portion 95. The belt-shaped left outer coupling member 25 has a reduced strength against a compressive load and an increased strength against a tensile load.

Specifically, the left outer coupling member 25 includes a first outer coupling portion 91, a second outer coupling portion 92, and a third outer coupling portion 93. The first outer coupling portion 91 is connected to the front surface 22c of the bumper beam 22. The second outer coupling portion 92 is bent from the first outer coupling portion 91 diagonally toward the rear of the vehicle body. The third outer coupling portion 93 is bent from the second outer coupling portion 92 toward the rear of the vehicle body. The first outer coupling portion 91 and the second outer coupling portion 92 are coupled to each other at the first outer bent portion 94. The second outer coupling portion 92 and the third outer coupling portion 93 are coupled to each other at the second outer bent portion 95.

The first outer coupling portion 91 is connected to the front surface 22c of the bumper beam 22 from the front of the vehicle body. Thus, an opening 89 of the front surface 22c of the bumper beam 22 is closed by the first outer coupling portion 91. Accordingly, the strength of the left end portion 22a of the bumper beam 22 can be preferably increased. Furthermore, the third outer coupling portion 93 is superposed on the outer side wall 21c of the left shock absorbing member 21 (that is, the outer side wall of the second shock absorbing member 43) from the outer side in the vehicle width direction.

In this state, a rear edge 93a of the third outer coupling portion 93 is one-side welded to the outer side wall 21c from the outer side in the vehicle width direction by laser welding, MIG welding, or the like. Thus, the third outer coupling portion 93 is connected to the outer side wall 21c of the left shock absorbing member 21. Thus, coupling strength is increased compared to a state in which the rear edge 93a of the third outer coupling portion 93 is butt welded to the front end portion 21a of the left shock absorbing member 21.

In a state in which the first outer coupling portion 91 and the third outer coupling portion 93 are connected, the second outer coupling portion 92 faces the upper recess 61b and the lower recess 61b of the second shock absorbing member 43. Thus, the second outer coupling portion 92 is maintained in a state in which the second outer coupling portion 92 is not connected to the second shock absorbing member 43 (that is, the left shock absorbing member 21).

As described above, the rear edge 93a of the third outer coupling portion 93 is connected to the outer side wall 21c. Furthermore, the second outer coupling portion 92 is maintained in a state in which the second outer coupling portion 92 is not connected to the left shock absorbing member 21. Thus, the third outer coupling portion 93 is connected to the outer side wall 21c separated from the front end portion 21a of the left shock absorbing member 21 (specifically, the upper front outer projecting angle portion 61a and the lower front outer projecting angle portion 61a) toward the rear of the vehicle body. Furthermore, the left outer coupling member 25 is formed by bending a belt-shaped metal plate. The strength of the belt-shaped metal plate against a compressive load is reduced.

Accordingly, in the event of, for example, a small overlap crash or a minor crash at the front of the vehicle, the left inner coupling member 24 (particularly the second outer coupling portion 92 in the non-connected state) can preferably undergo compressive deformation, and the left shock absorbing member 21 can be axially collapsed entirely from the front end portion 21a toward the rear of the vehicle. Thus, in the event of a small overlap crash or a minor crash at the front of the vehicle, shock energy can be preferably absorbed.

As illustrated in FIG. 2, as is the case with the left outer coupling member 25, the third outer coupling portion 93 of the right outer coupling member 25 is connected to the outer side wall 21c of the right shock absorbing member 21 so as to be superposed on the outer side wall 21c of the right shock absorbing member 21 from the outer side in the vehicle width direction. Thus, when the tensile force F3 acts on the bumper beam 22 due to the axial collapse of the left shock absorbing member 21 caused by a small overlap crash, the third outer coupling portion 93 is maintained in a state in which the third outer coupling portion 93 is connected to the outer side wall 21c of the right shock absorbing member 21. That is, a state in which the right end portion 22b of the bumper beam 22 is coupled to the front end portion 21a of the right shock absorbing member 21 by the right inner coupling member 24 and the right outer coupling member 25 is maintained.

Accordingly, the tensile force F3 toward the small overlap crash side is reliably transferred to the right front side frame 13 through the right shock absorbing member 21. Thus, shock energy can be preferably absorbed by utilizing resistance against deformation of the right front side frame 13 toward the small overlap crash side.

Figure 12A:
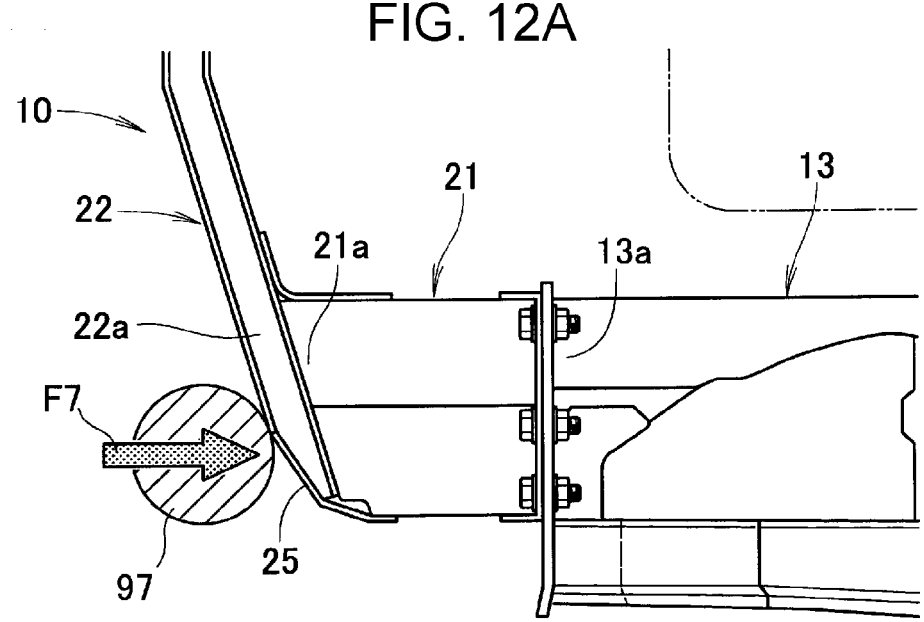
FIGS. 12A and 12B illustrate an example in which coupling between a bumper beam and a right shock absorbing member is maintained at an initial stage of a small overlap crash.

Next, an example is described with reference to FIGS. 12A to 13. In this example, a shock load F7 input to the left end portion 22a of the bumper beam 22 due to a small overlap crash is absorbed by the vehicle body front structure 10 according to the present application. As illustrated in FIG. 12A, the left end portion 22a of the bumper beam 22 outwardly extends in the vehicle width direction and angled toward the rear of the vehicle body. Due to a small overlap crash of an obstacle 97 into the angled left end portion 22a, the shock load F7 is input.

Figure 12B:
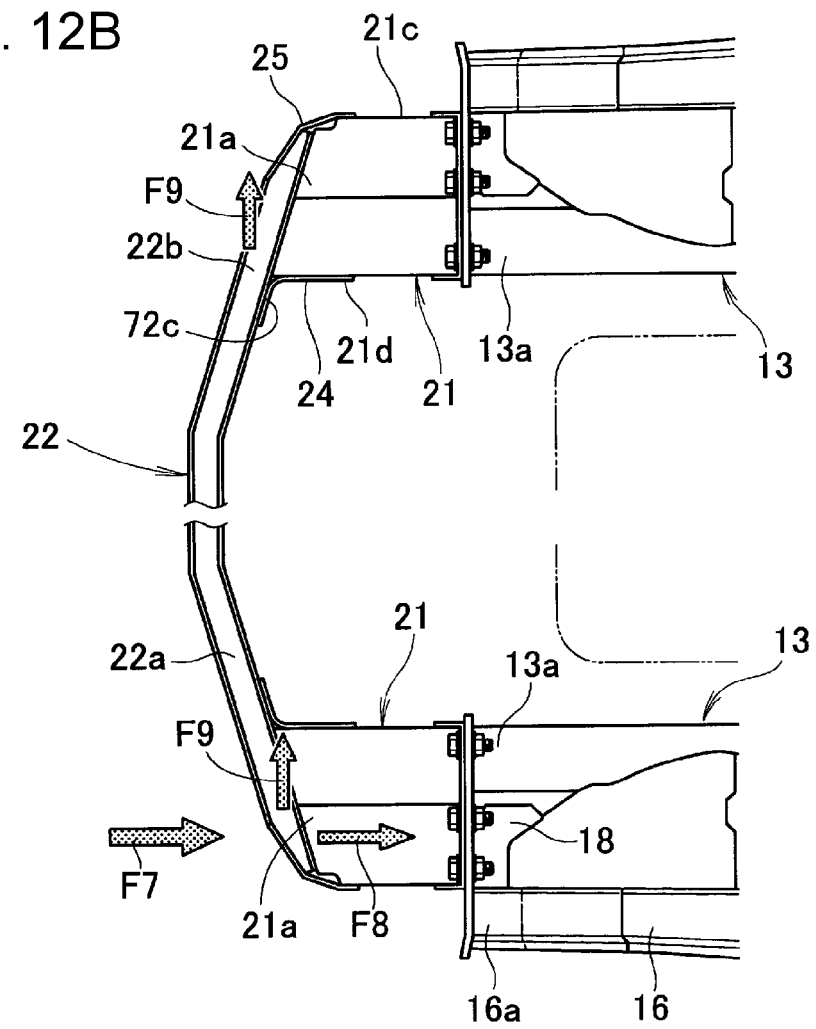

As illustrated in FIG. 12B, at an initial stage of the small overlap crash, a component force F8 of the shock load F7 having been input to the left end portion 22a of the bumper beam 22 acts on the left shock absorbing member 21. Meanwhile, a component force F9 of the shock load F7 laterally (that is, inward in the vehicle width direction) acts on the bumper beam 22. The component force F9 acting on the bumper beam 22 functions as a force that separates the right end portion 22b of the bumper beam 22 from the front end portion 21a of the right shock absorbing member 21.

Here, the inner wall front portion 21d of the right shock absorbing member 21 and the rear wall right portion 72c of the bumper beam 22 are coupled to each other by the right inner coupling member 24. Furthermore, the outer side wall 21c of the right shock absorbing member 21 and the right end portion 22b of the bumper beam 22 are coupled to each other by the right outer coupling member 25. Thus, coupling between the right end portion 22b of the bumper beam 22 and the front end portion 21a of the right shock absorbing member 21 is maintained by the right inner coupling member 24 and the right outer coupling member 25.

Figure 13:
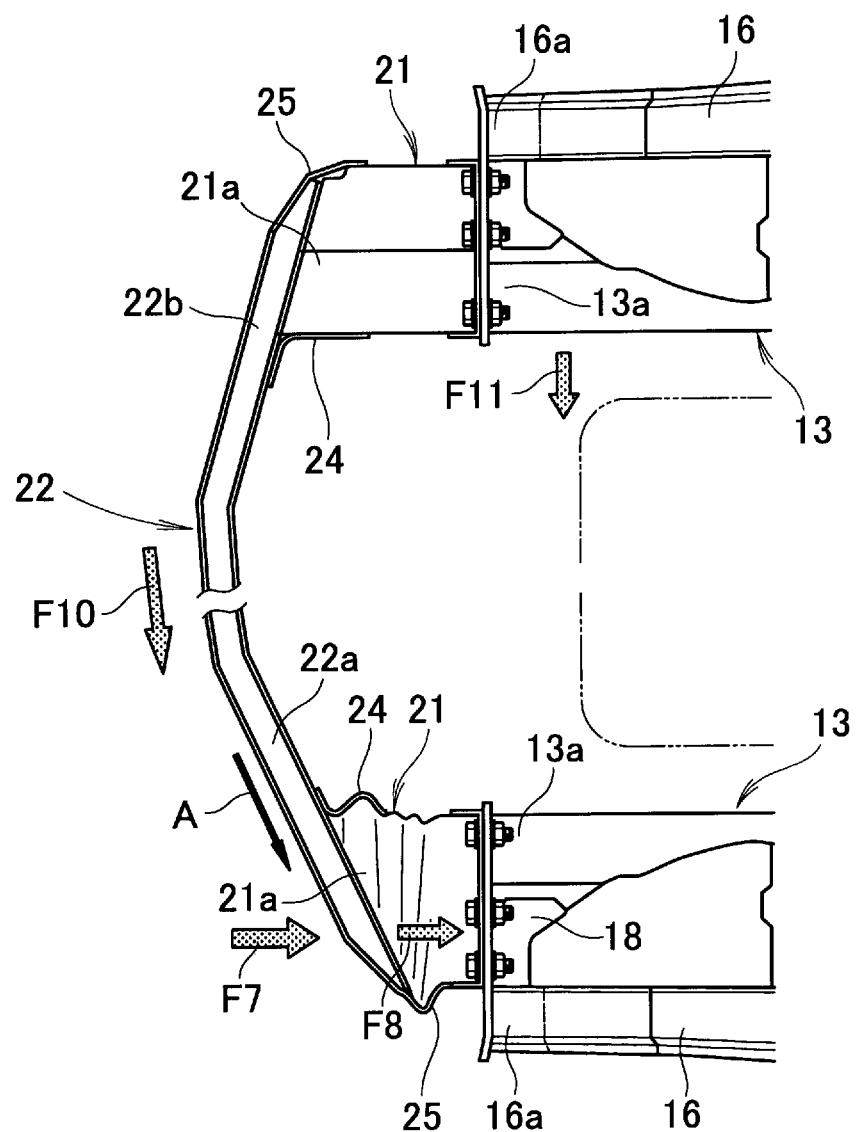
FIG. 13 illustrates an example in which a shock load applied due to a small overlap crash is absorbed by the vehicle body front structure according to the present application.

As illustrated in FIG. 13, when the small overlap crash advances, the left shock absorbing member 21 is axially collapsed toward the rear of the vehicle body due to the component force F8. The left end portion 22a of the bumper beam 22 is pulled as indicated by an arrow A by the axial collapse of the left shock absorbing member 21. Thus, a tensile force F10 toward the small overlap crash side acts on the bumper beam 22. Here, the right end portion 22b of the bumper beam 22 and the front end portion 21a of the right shock absorbing member 21 are coupled to each other by the right inner coupling member 24 and the right outer coupling member 25.

Accordingly, the tensile force F10 acting on the bumper beam 22 is transferred as a bending load F11 to the right front side frame 13 through the right end portion 22b of the bumper beam 22 and the right shock absorbing member 21. With the bending load F11 supported by the right front side frame 13, shock energy can be preferably absorbed by utilizing the resistance against deformation of the right front side frame 13. Thus, the shock energy generated by the small overlap crash can be preferably absorbed by axially collapsing the left shock absorbing member 21 and utilizing the resistance against deformation of the right front side frame 13.

Figure 14A:
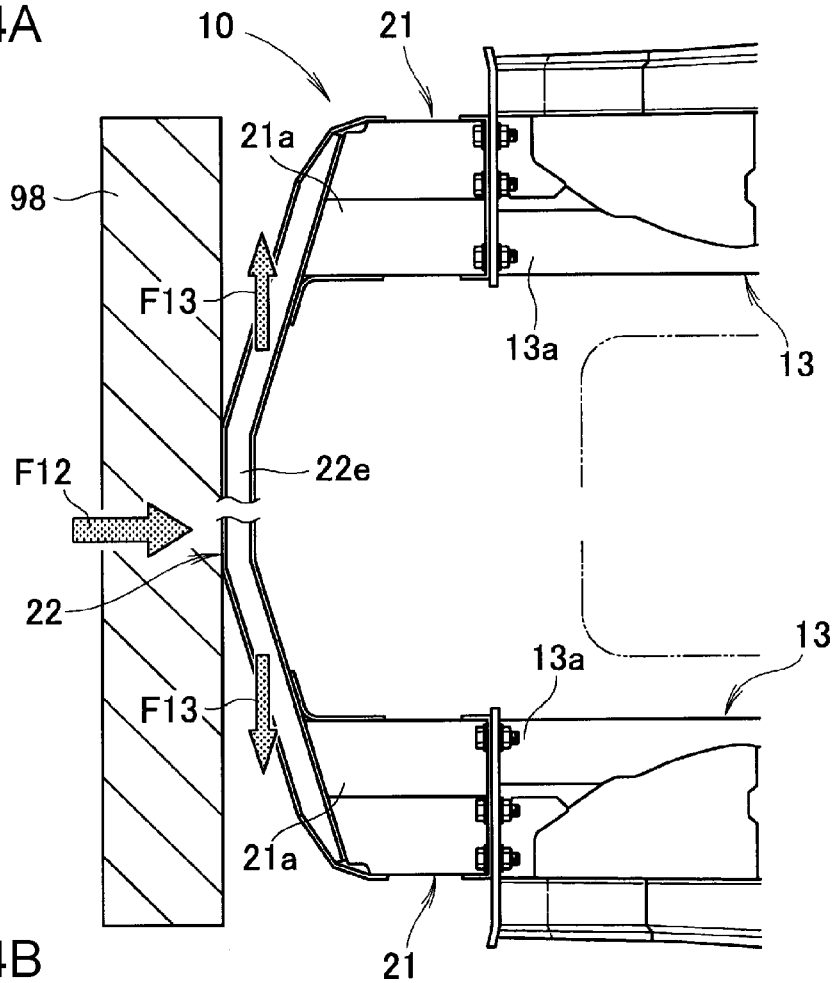
FIGS. 14A and 14B illustrate an example in which a left inner coupling member and a left outer coupling member are preferably deformed by a minor crash at the front of a vehicle by the vehicle body front structure according to the present application.

Next, an example is described with reference to FIGS. 14A to 15. In this example, a shock load F12 due to a minor crash at the front of the vehicle is absorbed by the vehicle body front structure 10 according to the present application. As illustrated in FIG. 14A, due to a minor crash at the front of the vehicle in which an obstacle 98 lightly crashes into the front of the vehicle, a shock load F12 is input to the center of the bumper beam 22. Here, the left end portion 22a of the bumper beam 22 and the right end portion 22b of the bumper beam 22 extend in directions that are outward in the vehicle width direction and diagonally rearward in the vehicle front-rear direction. Accordingly, at an initial stage of the minor crash at the front of the vehicle, component forces F13 of the shock load F12 having been input to a center 22e of the bumper beam 22 laterally (that is, outward in the vehicle width direction) act on the bumper beam 22.

Figure 14B:
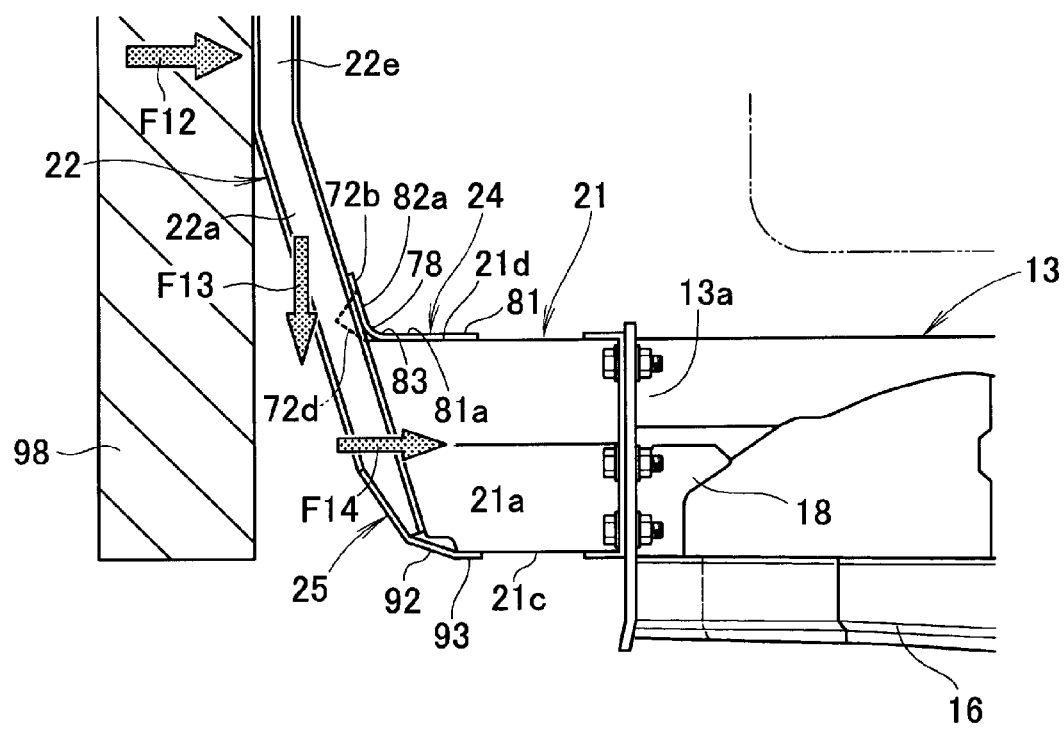

It is though that, as illustrated in FIG. 14B, due to the lateral component force F13 acting on the bumper beam 22, a portion 72d between the intersection 78 and the rear wall left portion 72b of the bumper beam 22 is recessed to have a substantially V shape into the bumper beam 22 (indicated by a broken line). Here, the left inner coupling member 24 is maintained in a state in which the left inner coupling member 24 (specifically, the proximal region 82a of the inner bent portion 83) is not connected to the portion 72d between the intersection 78 and the rear wall left portion 72b. Accordingly, breakage of the left inner coupling member 24 is prevented.

Thus, the left end portion 22a of the bumper beam 22 is maintained in a state in which the left end portion 22a of the bumper beam 22 is coupled to the front end portion 21a of the left shock absorbing member 21 by the left inner coupling member 24. With the coupled state maintained, the shock load F12 acting on the center 22e of the bumper beam 22 is transferred as a component force F14 to the front end portion 21a of the left shock absorbing member 21.

Here, the left inner coupling member 24 (specifically, the inner bent portion 83 and the front half portion 81a of the first inner coupling portion 81) is maintained in a state in which the left inner coupling member 24 is not connected to the intersection 78 and the inner wall front portion 21d. Furthermore, the second outer coupling portion 92 of the left outer coupling member 25 is maintained in a state in which the second outer coupling portion 92 of the left outer coupling member 25 is not connected to the left shock absorbing member 21. Thus, the left inner coupling member 24 and the left outer coupling member 25 can be preferably deformed (caused to undergo compressive deformation) by the load F14 input to the left shock absorbing member 21.

Figure 15:
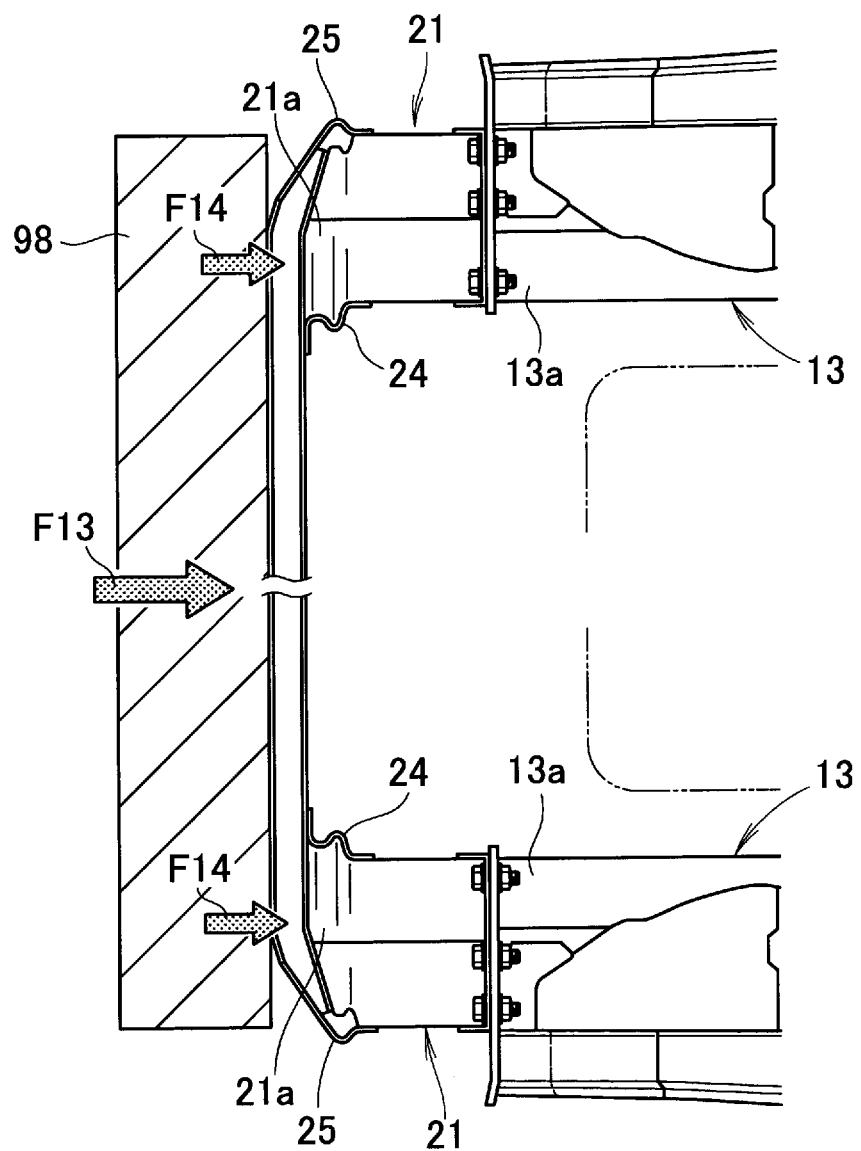
FIG. 15 illustrates an example in which a shock load applied due to a minor crash at the front of the vehicle is absorbed by the vehicle body front structure according to the present application.

As illustrated in FIG. 15, the left shock absorbing member 21 can be preferably axially collapsed entirely from the front end portion 21a toward the rear of the vehicle body by deforming the left inner coupling member 24 and the left outer coupling member 25. Likewise, the right shock absorbing member 21 can be preferably axially collapsed entirely from the front end portion 21a toward the rear of the vehicle body by deforming the right inner coupling member 24 and the right outer coupling member 25. Thus, the shock load F13 (that is, shock energy) at the front of the vehicle applied by a minor crash can be preferably absorbed without deforming the left front side frame 13 and the right front side frame 13.

As has been described with reference to FIGS. 12A to 15, with the vehicle body front structure 10 according to the present application, the shock load F7 applied due to a small overlap crash can be preferably absorbed. Furthermore, the shock load F13 applied due to a minor crash at the front of the vehicle can be preferably absorbed. That is, the vehicle body front structure 10 can be applied to both types of crashes, that is, a small overlap crash and a minor crash at the front of the vehicle, and shock energy generated by both the types of crashes can be preferably absorbed.

The vehicle body front structure according to the present application is not limited to the above-described embodiment and can be appropriately subjected to modification, improvement, and the like. For example, although an example is described in which the coupling plate 41 of the left shock absorbing member 21, the first shock absorbing member 42, and the second shock absorbing member 43 are formed by extruding a light metal material such as an aluminum alloy according to the above-described embodiment, this is not limiting. The coupling plate 41 of the left shock absorbing member 21, the first shock absorbing member 42, and the second shock absorbing member 43 can be formed of, for example, another material such as steel sheet.

Furthermore, although the fragile portion is exemplified by the bead 58 according to the above-described embodiment, this is not limiting. The fragile portion can be formed by an opening, a slit, a small thickness part, or the like.

Furthermore, although the fastening members are exemplified by the bolts 51 and the nuts 52 according to the above-described embodiment, this is not limiting. Rivets or the like can be used as the fastening members.

Furthermore, although an example is described in which two members, that is, the left inner coupling member 24 and the left outer coupling member 25 are coupled to the left shock absorbing member 21 and the bumper beam 22 according to the above-described embodiment, this is not limiting. For example, a single member, that is, the left inner coupling member 24 can be coupled to the left shock absorbing member 21 and the bumper beam 22.

Furthermore, the shapes and the configurations of the following elements described according to the embodiment are not limited to those described as examples and can be appropriately modified: the vehicle body front structure, the left and right front side frames, the left and right coupling brackets, the left and right shock absorbing members, the bumper beam, the left and right recessed angle portions, the left and right inner coupling members, the left and right outer coupling members, the coupling plate, the first shock absorbing member, the second shock absorbing member, the inner flange, the outer flange, the insertion holes, the bead, the beam rear wall, the intersection, the first end portion, the second end portion, and so forth.

The present application is preferably applied to an automobile that includes a vehicle body front structure in which a shock absorbing member projects from a front side frame toward the front of a vehicle body and a bumper beam is coupled to the shock absorbing member.

What is claimed is:
1. A vehicle body front structure comprising:
    front side frames extending in a vehicle front-rear direction and provided on one side and another side of a vehicle body in a vehicle width direction;
    shock absorbing members that are provided to front end portions of the respective front side frames and have side walls projecting from the front end portions of the front side frames toward a front side of the vehicle body in the vehicle front-rear direction;
    a bumper beam that has a rear wall coupled to front end portions of the shock absorbing members and that extends in the vehicle width direction to bridge therebetween, the rear wall of the bumper beam and each side wall of the shock absorbing members on a vehicle inner side thereof forming angle portions with intersections between the side wall and the rear wall; and
    coupling members each disposed at a corresponding one of the angle portions and having a substantially L shape extending along the corresponding angle portion in plan view of the vehicle,
    wherein each coupling member comprises,
        a first end portion that is connected to the side wall of the shock absorbing members at a position away from the intersection of the corresponding angle portion, and
        a second end portion that is connected to the rear wall of the bumper beam at a position away from the intersection of the corresponding angle portion.
2. The vehicle body front structure according claim 1, wherein the coupling member is formed by bending a belt-shaped metal plate into the substantially L-shape, a periphery of the first end portion is connected along the substantially U shape to the side wall, and a periphery of the second end portion is connected along the substantially U shape to the rear wall.
3. The vehicle body front structure according claim 1, wherein the shock absorbing members each have a fragile portion between the corresponding intersection and the first end portion of the corresponding side wall.
4. The vehicle body front structure according to claim 1, further comprising:
    outer coupling members that are provided at front surfaces of end portions of the bumper beam and that are connected to outer side walls of the shock absorbing members such that the outer coupling members are superposed on the outer side walls.
5. The vehicle body front structure according claim 1, wherein the shock absorbing members comprise coupling plates that are fastened to the front end portions of the front side frames by fastening members,
    wherein each of the coupling plates comprises,
        an inner flange that extends along the side wall of a corresponding one of the shock absorbing members and that is connected to the side wall, and
        an outer flange that extends along an outer side wall of the shock absorbing member and that is connected to the outer side wall.
6. The vehicle body front structure according claim 5, wherein each of the coupling plates has an insertion hole through which a corresponding one of the fastening members is inserted, and the coupling plate is fastened to the front end portion of a corresponding one of the front side frame by a fastening surface pressure applied by the fastening member inserted through the insertion hole, and
    wherein a hole diameter of the insertion hole is set such that, when a small overlap crash occurs at one end portion of the bumper beam, the fastening surface pressure is smaller than a tensile force acting on the fastening member on an opposite end portion side of the bumper beam.

7. The vehicle body front structure according to claim 1, further comprising:
load transfer members that extend outward in the vehicle width direction from the front end portions of the front side frames,
wherein the shock absorbing members are coupled to the front end portions of the front side frames and the front end portions of the load transfer members.

8. The vehicle body front structure according claim 7, wherein the shock absorbing members each comprise,
a first shock absorbing member having a closed section that has a plurality of small sections and that extends in the vehicle front-rear direction, and
a second shock absorbing member that is disposed further to the outer side than the first shock absorbing member in the vehicle width direction and that has a closed section that has a plurality of small sections and that extends in the vehicle front-rear direction.

9. The vehicle body front structure according claim 4, wherein the bumper beam has a closed section that has a plurality of small sections, the front surfaces of the end portions of the bumper beam are open so as to face in directions that are outward in the vehicle width direction and diagonally rearward in a vehicle front-rear direction, and the front surfaces that are open are closed by the outer coupling members.

10. A vehicle body front structure comprising:
front side frames extending in a vehicle front-rear direction and provided on one side and another side of a vehicle body in a vehicle width direction;
shock absorbing members that are provided to front end portions of the respective front side frames and have side walls projecting from the front end portions of the front side frames toward a front side of the vehicle body in the vehicle front-rear direction;
a bumper beam that has a rear wall coupled to front end portions of the shock absorbing members and that extends in the vehicle width direction to bridge therebetween, the rear wall of the bumper beam and each side wall of the shock absorbing members on a vehicle inner side thereof forming angle portions with intersections between the side wall and the rear wall; and
coupling members each disposed at a corresponding one of the angle portions and having a substantially L shape extending along the corresponding angle portion in plan view of the vehicle,
wherein each coupling member comprises,
a first end portion that is connected to the side wall of the shock absorbing members at a position away from the intersection of the corresponding angle portion, and
a second end portion that is connected to the rear wall of the bumper beam at a position away from the intersection of the corresponding angle portion, and
wherein the shock absorbing members each have a fragile portion between the corresponding intersection and the first end portion of the corresponding side wall.

\* \* \* \* \*